US010437008B2

(12) United States Patent
Saita et al.

(10) Patent No.: US 10,437,008 B2
(45) Date of Patent: Oct. 8, 2019

(54) PRISM UNIT

(71) Applicant: FUJIFILM Corporation, Tokyo (JP)

(72) Inventors: Arihiro Saita, Saitama (JP); Kazumi Koike, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 264 days.

(21) Appl. No.: 15/663,099

(22) Filed: Jul. 28, 2017

(65) Prior Publication Data

US 2017/0329100 A1 Nov. 16, 2017

Related U.S. Application Data

(63) Continuation of application No. PCT/JP2016/050077, filed on Jan. 5, 2016.

(30) Foreign Application Priority Data

Jan. 30, 2015 (JP) .................................. 2015-016667

(51) Int. Cl.
*G02B 7/18* (2006.01)
*G02B 5/04* (2006.01)
(Continued)

(52) U.S. Cl.
CPC ............. *G02B 7/1805* (2013.01); *G02B 5/04* (2013.01); *G02B 27/1013* (2013.01);
(Continued)

(58) Field of Classification Search
CPC .... G02B 7/1805; G02B 5/04; G02B 27/1023; H04N 9/097; G03B 17/17
(Continued)

(56) References Cited

U.S. PATENT DOCUMENTS 2,382,580 A * 8/1945 Rackett .................. G03B 33/00
359/638
2,780,142 A * 2/1957 Bouwers ................ G02B 13/08
359/669
(Continued)

FOREIGN PATENT DOCUMENTS

JP 61-153124 U 9/1986
JP 7-084175 A 12/1988
(Continued)

OTHER PUBLICATIONS

International Preliminary Report on Patentability (PCT/IPEA/409) issued in PCT/JP2016/050077, completed on Oct. 17, 2016.
(Continued)

*Primary Examiner* — Ricky D Shafer
(74) *Attorney, Agent, or Firm* — Birch, Stewart, Kolasch & Birch, LLP

(57) ABSTRACT

In a color separation prism that includes a first and second prism blocks bonded to each other, the first and second prism blocks are bonded to the first and second adhesive portions of the first and second base plates, respectively. The first and second base plates are fixed to the first and second base plate-fixing portions of a base with the first and second base-fixing portion interposed therebetween, respectively. The second adhesive portion is disposed between the first and second base plate-fixing portions so that a direction in which the second base plate-fixing portion is displaced from the first base plate-fixing portion and a direction in which the second adhesive portion is displaced from the second base-fixing portion are opposite to each other in a case in which the base and the second base plate expand or contract due to a change in temperature.

20 Claims, 11 Drawing Sheets

(51) Int. Cl.
*G03B 21/14* (2006.01)
*H04N 9/097* (2006.01)
*G02B 27/10* (2006.01)
*G03B 17/17* (2006.01)
*G03B 33/04* (2006.01)
*G02B 27/12* (2006.01)

(52) U.S. Cl.
CPC ............ *G03B 17/17* (2013.01); *G03B 21/14* (2013.01); *G03B 33/04* (2013.01); *H04N 9/097* (2013.01); *G02B 27/126* (2013.01)

(58) Field of Classification Search
USPC .................................. 359/831; 348/337, 338
See application file for complete search history.

(56) References Cited

U.S. PATENT DOCUMENTS

| | | | | |
|---|---|---|---|---|
| 3,049,972 | A | * | 8/1962 | Malinowski ........... G02B 23/18 359/413 |
| 4,890,899 | A | * | 1/1990 | Aoki ................. G02B 27/1013 348/E9.008 |
| 7,147,333 | B2 | * | 12/2006 | Shirota ................ G02B 7/1805 353/81 |
| 2007/0258051 | A1 | | 11/2007 | Kitabayashi |
| 2008/0297926 | A1 | | 12/2008 | Sakata et al. |
| 2016/0116831 | A1 | * | 4/2016 | Haga ..................... H04N 9/317 353/69 |

FOREIGN PATENT DOCUMENTS

| | | | |
|---|---|---|---|
| JP | 63-298202 | A | 12/1988 |
| JP | 1-081613 | U | 5/1989 |
| JP | 9-000310 | U | 5/1997 |
| JP | 2001-042204 | A | 2/2001 |
| JP | 2007-292924 | A | 2/2001 |
| JP | 2008-298960 | A | 12/2008 |
| JP | 2009-271222 | A | 11/2009 |
| JP | 2014-217033 | A | 11/2014 |

OTHER PUBLICATIONS

International Search Report (PCT/ISA/210) issued in PCT/JP2016/050077, dated Apr. 5, 2016

Written Opinion (PCT/ISA/237) issued in PCT/JP2016/050077, dated Apr. 5, 2016.

* cited by examiner

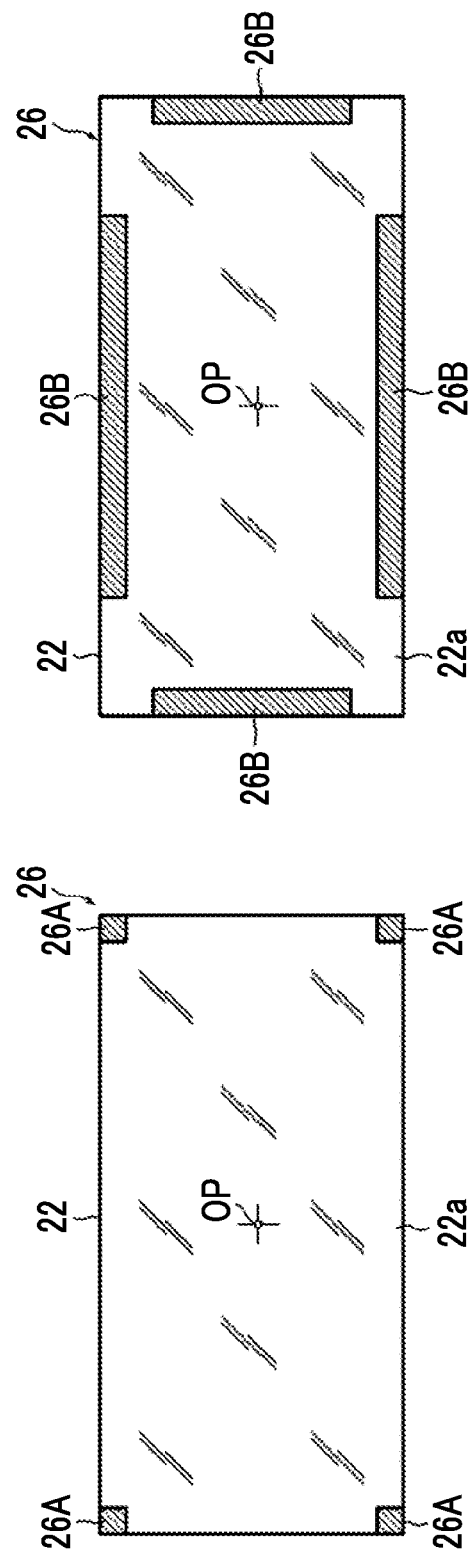

FIG. 12

| | | A | B | C | D | E | F | G | H | I | J | K |
|---|---|---|---|---|---|---|---|---|---|---|---|---|
| BASE | MATERIAL | STAINLESS STEEL | | | | | | | | | | |
| | LINEAR EXPANSION COEFFICIENT ($\alpha$) | $1.7 \times 10^{-5}$ (1.7E-5) | | | | | | | | | | |
| SECOND BASE PLATE | MATERIAL | ALUMINUM ALLOY | | | | | | | | | | |
| | LINEAR EXPANSION COEFFICIENT ($\beta$) | $2.4 \times 10^{-5}$ (2.4E-5) | | | | | | | | | | |
| PRISM | MATERIAL | OPTICAL GLASS (BK7) | | | | | | | | | | |
| | LINEAR EXPANSION COEFFICIENT ($\gamma$) | $7.1 \times 10^{-6}$ (7.1E-6) | | | | | | | | | | |
| | CONDITION | A | B | C | D | E | F | G | H | I | J | K |
| | L [mm] | 10.8 | 11.0 | 11.1 | 11.7 | 11.9 | 12.0 | 12.1 | 12.2 | 12.9 | 13.0 | 13.2 |
| | M [mm] | 7.0 | 7.0 | 7.0 | 7.0 | 7.0 | 7.0 | 7.0 | 7.0 | 7.0 | 7.0 | 7.0 |
| | (L−M) [mm] | 3.8 | 4.0 | 4.1 | 4.7 | 4.9 | 5.0 | 5.1 | 5.2 | 5.9 | 6.0 | 6.2 |
| | $\alpha L \Delta T - \beta M \Delta T - \gamma (L-M) \Delta T$ | $-5.2 \times 10^{-4}$ (−5.2E-4) | $-4.5 \times 10^{-4}$ (−4.5E-4) | $-4.0 \times 10^{-4}$ (−4.0E-4) | $-9.3 \times 10^{-5}$ (−9.3E-5) | $-4.5 \times 10^{-5}$ (−4.5E-5) | $2.2 \times 10^{-5}$ (2.2E-5) | $4.4 \times 10^{-5}$ (4.4E-5) | $9.6 \times 10^{-5}$ (9.6E-5) | $4.0 \times 10^{-4}$ (4.0E-4) | $4.6 \times 10^{-4}$ (4.6E-4) | $5.4 \times 10^{-4}$ (5.4E-4) |
| | RESULT OF ENVIRONMENTAL TEST | CRACKS ARE GENERATED IN BONDING PORTION OF PRISM AND BONDING PORTION IS PEELED | CRACKS ARE GENERATED IN BONDING PORTION OF PRISM | NOT PEELED | NOT PEELED | NOT PEELED | NOT PEELED | NOT PEELED | NOT PEELED | NOT PEELED | CRACKS ARE GENERATED IN BONDING PORTION OF BASE PLATE AND PRISM | CRACKS ARE GENERATED IN BONDING PORTION OF BASE PLATE AND BONDING PORTION IS PEELED |

PREFERABLE RANGE $\pm 4 \times 10^{-4}$

MORE PREFERABLE RANGE $\pm 1 \times 10^{-4}$

STILL MORE PREFERABLE RANGE $\pm 5 \times 10^{-5}$

PRISM UNIT

CROSS-REFERENCE TO RELATED APPLICATIONS

The present application is a Continuation of PCT International Application No. PCT/JP2016/050077 filed on Jan. 5, 2016 claiming priority under 35 U.S.C § 119(a) to Japanese Patent Application No. 2015-016667 filed on Jan. 30, 2015. Each of the above applications is hereby expressly incorporated by reference, in their entirety, into the present application.

BACKGROUND OF THE INVENTION

1. Field of the Invention

The present invention relates to a prism unit, and more particularly, to a prism unit in which a composite prism including a plurality of prisms bonded to each other is supported by a base.

2. Description of the Related Art

Generally, a 3-plate type camera divides light, which has passed through an imaging lens, into light having three colors, that is, red (R) light, green (G) light, and blue (B) light by a color separation prism; and receives the divided light by individual light-receiving elements. The color separation prism is formed of a composite prism in which a plurality of prisms are integrally combined, is mounted on a base included in a camera body, and is assembled to the camera body.

In the past, a color separation prism has been directly bonded to a base and has been assembled to a camera body (see JP1995-84175A (JP-H07-84175A)). In this case, the color separation prism has been bonded to the base over a bonding portion between prisms.

Further, in other assembly methods, a color separation prism has been bonded to one base plate and the base plate has been screwed to a base and has been assembled to a camera body (see JP1997-310U (JP-H09-310U), JP2001-42204A, and JP2008-298960A). Even in this case, the color separation prism has been bonded and mounted on one base plate over a bonding portion between prisms.

Furthermore, a method of supporting only one prism by bonding only one prism to a base is also known as a method of supporting a composite prism (see JP1989-81613U (JP-H01-81613U) and JP1986-153124U (JP-S61-153124U)).

SUMMARY OF THE INVENTION

However, if the composite prism is bonded to the base over the bonding portion between prisms when the composite prism is mounted on the base, there is a drawback that the bonding portion between the prisms is peeled due to a difference between the linear expansion coefficient of the prism and the linear expansion coefficient of the base when a change in temperature is received. Particularly, since the prisms are partially bonded to each other in a bonding portion including an air layer, there is a drawback that a bonding force is small in the bonding portion and the bonding portion is likely to be peeled when a change in temperature is received. There is the same drawback even in a case in which the composite prism is bonded to one base plate over a bonding portion between prisms.

There is no this problem in the method of supporting only one prism by bonding only one prism to a base, but there is a drawback that the prism is unstably supported.

The invention has been made in consideration of these circumstances, and an object of the invention is to provide a prism unit that can stably support a composite prism and is strong against a change in temperature.

Means for achieving the above-mentioned object are as follows.

(1) A prism unit comprises a composite prism that includes a first prism block and a second prism block bonded to each other, a first base plate that comprises a first adhesive portion and a first base-fixing portion, a second base plate that comprises a second adhesive portion and a second base-fixing portion, and a base that comprises a first base plate-fixing portion and a second base plate-fixing portion. The first prism block includes at least one prism and the second prism block including at least one prism, the first prism block is bonded to the first adhesive portion, the second prism block is bonded to the second adhesive portion, and the first base-fixing portion of the first base plate is fixed to the first base plate-fixing portion and the second base-fixing portion of the second base plate is fixed to the second base plate-fixing portion. The second adhesive portion is disposed between the first base plate-fixing portion and the second base plate-fixing portion, and a direction in which the second base plate-fixing portion is displaced from the first base plate-fixing portion and a direction in which the second adhesive portion is displaced from the second base-fixing portion are opposite to each other in a case in which the base and the second base plate expand or contract due to a change in temperature.

According to this aspect, the first prism block of the composite prism is bonded to the first adhesive portion of the first base plate and the second prism block thereof is bonded to the second adhesive portion of the second base plate. The first base plate is fixed to the first base plate-fixing portion, which is included in the base, with the first base-fixing portion interposed therebetween; and the second base plate is fixed to the second base plate-fixing portion, which is included in the base, with the second base-fixing portion interposed therebetween. The second adhesive portion is disposed between the first base plate-fixing portion and the second base plate-fixing portion so that a direction in which the second base plate-fixing portion is displaced from the first base plate-fixing portion and a direction in which the second adhesive portion is displaced from the second base-fixing portion are opposite to each other in a case in which the base and the second base plate expand or contract due to a change in temperature. Accordingly, since a force acting between the first and second prism blocks can be offset when a change in temperature is received, the peeling of the bonding portion from the first and second prism blocks can be prevented. Further, since the first and second prism blocks are supported, the entire composite prism can be supported.

(2) In the prism unit according to (1), in a case in which a linear expansion coefficient of the base is denoted by $\alpha$, an equivalent linear expansion coefficient of the second base plate is denoted by $\beta$, an equivalent linear expansion coefficient of the composite prism is denoted by $\gamma$, a distance between the first and second base plate-fixing portions is denoted by L mm, a distance between the second base-fixing portion and the second adhesive portion is denoted by M mm, and a change in the temperature of the prism unit up to 70° C. from 25° C. is denoted by $\Delta T°$ C., a relationship of "$\alpha<\beta$ and $-4\times10^{-4} \leq \alpha L\Delta T - \beta M\Delta T - \gamma(L-M)\Delta T \leq 4\times10^{-4}$" is satisfied.

According to this aspect, in a case in which the linear expansion coefficient of the base is denoted by $\alpha$, the equivalent linear expansion coefficient of the second base plate is denoted by $\beta$, the equivalent linear expansion coefficient of the composite prism is denoted by $\gamma$, the distance between the first and second base plate-fixing portions is denoted by $L$ mm, the distance between the second base-fixing portion and the second adhesive portion is denoted by $M$ mm, and a change in the temperature of the prism unit up to 70° C. from 25° C. is denoted by $\Delta T°$ C., materials and the disposition of the respective fixing portions and the respective adhesive portions are set so as to satisfy the relationship of "$\alpha<\beta$ and $-4\times10^{-4} \leq \alpha L\Delta T - \beta M\Delta T - \gamma(L-M)\Delta T \leq 4\times10^{-4}$". Accordingly, the prism unit can be made to have a structure that is strong against a change in temperature.

Here, "$\alpha L\Delta T - \beta M\Delta T - \gamma(L-M)\Delta T$" of the conditions of "$\alpha<\beta$ and $-4\times10^{-4} \leq \alpha L\Delta T - \beta M\Delta T - \gamma(L-M)\Delta T \leq 4\times10^{-4}$" represents a change in the interval of the bonding portion between the prism blocks when a change in temperature is received. It is possible to prevent the peeling of the bonding portion between the prism blocks, which is caused by a change in temperature, by setting materials and the disposition of the respective fixing portions and the respective adhesive portions so that this change in the interval is within a predetermined allowable range, that is, the range of $\pm 4\times10^{-4}$ mm.

The allowable range of the change in the interval is determined according to the bonding strength of the bonding portion between the prism blocks, and is more preferably $\pm 1\times10^{-4}$ mm and still more preferably $\pm 5\times10^{-5}$ mm. The bonding strength of the bonding portion is changed according to the viscosity or adhesive area of an adhesive to be used at the time of bonding, and the bonding strength of the bonding portion becomes high with an increase in the viscosity of an adhesive, and becomes high with an increase in the adhesive area.

In a case in which the second base plate is made of a single material, the equivalent linear expansion coefficient of the second base plate is the linear expansion coefficient of the material. In a case in which the second base plate is made of two or more different materials, the equivalent linear expansion coefficient of the second base plate is an average value of the linear expansion coefficients of the materials. For example, in a case in which the second base plate is made of a first material and a second material, the equivalent linear expansion coefficient $\beta$ of the second base plate is $(\beta 1 \times M1 + \beta 2 \times M2)/M$ when a distance between the second base-fixing portion and the second adhesive portion is denoted by $M$ mm, the length of the first material included therebetween is denoted by $M1$ mm, the length of the second material is denoted by $M2$ mm, the linear expansion coefficient of the first material is denoted by $\beta 1$, and the linear expansion coefficient of the second material is denoted by $\beta 2$.

As described above, in a case in which the composite prism is formed of prisms made of a single material, the equivalent linear expansion coefficient of the composite prism is the linear expansion coefficient of the material. In a case in which the composite prism is formed of prisms made of different materials, the equivalent linear expansion coefficient of the composite prism is a weighted average value of the linear expansion coefficients that is obtained from the lengths of the materials in a direction in which the extension evaluation of the linear expansion coefficient of each of the materials is performed.

(3) In the prism unit according to (1) or (2), the first base plate has a linear expansion coefficient equal to the linear expansion coefficient of the first prism block.

According to this aspect, the first base plate has a linear expansion coefficient equal to the linear expansion coefficient of the first prism block. Accordingly, the peeling of the adhesive portions from the first base plate and the first prism block can be effectively prevented. "Equal" mentioned here includes a range in which the linear expansion coefficient of the first base plate is approximated to the linear expansion coefficient of the first prism block other than a case in which the linear expansion coefficient of the first base plate is completely the same as the linear expansion coefficient of the first prism block. That is, "equal" mentioned here includes the range of "substantially equal". In terms of the prevention of the peeling of the adhesive portions, the reason for this is that the peeling of the adhesive portions can be effectively prevented if the first base plate has a linear expansion coefficient substantially equal to the linear expansion coefficient of the first prism block.

(4) In the prism unit according to any one of (1) to (3), the second base plate includes a first component and a second component bonded to each other, the first component comprises the second adhesive portion and has a linear expansion coefficient equal to a linear expansion coefficient of the first base plate, and the second component comprises the second base-fixing portion and has a linear expansion coefficient higher than the linear expansion coefficient of the base.

According to this aspect, the second base plate includes a first component and a second component bonded to each other, the first component has a linear expansion coefficient equal to the linear expansion coefficient of the first base plate, and the second component has a linear expansion coefficient higher than the linear expansion coefficient of the base. The first component comprises the second adhesive portion, and the second prism block is bonded to the first component with the second adhesive portion interposed therebetween. Further, the second component comprises the second base-fixing portion, and is fixed to the base with the second base-fixing portion interposed therebetween. Accordingly, a relationship between the height of the first adhesive portion and the height of the second adhesive portion can be always maintained constant even in a case in which temperature is changed. Therefore, since the application of stress in a planar direction to the bonding portion can be prevented, the prism unit can be made to have a structure that is stronger against a change in temperature. "Equal" mentioned here includes a range in which the linear expansion coefficient of the component is approximated to the linear expansion coefficient of the base other than a case in which the linear expansion coefficient of the component is completely the same as the linear expansion coefficient of the base. That is, "equal" mentioned here includes the range of "substantially equal".

(5) In the prism unit according to any one of (1) to (4), a difference between the position of the center of the first adhesive portion and the position of the center of the first base-fixing portion is within $\pm 5$ mm.

According to this aspect, the difference between the position of the center of the first adhesive portion and the position of the center of the first base-fixing portion is set within $\pm 5$ mm. That is, the first adhesive portion and the first base-fixing portion are disposed substantially coaxially with each other. Accordingly, an influence caused by the thermal deformation of the first base plate can be further reduced.

(6) In the prism unit according to any one of (1) to (5), the first base-fixing portion is formed of a bolt hole and the first base plate is fixed to the first base plate-fixing portion of the base by a first bolt, and the second base-fixing portion is formed of a bolt hole and the second base plate is fixed to the second base plate-fixing portion of the base by a second bolt.

According to this aspect, the first base-fixing portion is formed of a bolt hole and the first base plate is fixed to the first base plate-fixing portion of the base by the first bolt. Further, the second base-fixing portion is formed of a bolt hole and the second base plate is fixed to the second base plate-fixing portion of the base by the second bolt. Accordingly, the composite prism can be easily assembled to the base.

(7) In the prism unit according to any one of (1) to (6), in a case in which a line passing through a center of a panel surface of an image forming panel adjacent to the composite prism and perpendicular to the panel surface is set as an optical axis, the first and second prism blocks of the composite prism are bonded to each other so as to form an air layer in a region including the optical axis.

According to this aspect, the first and second prism blocks are bonded to each other with an air layer interposed therebetween. In a case in which a line passing through the center of the panel surface of the image forming panel adjacent to the composite prism and perpendicular to the panel surface is set as an optical axis, the air layer is formed in a region including the optical axis. Since the bonding strength of the bonding portion deteriorates when the air layer is formed in the bonding portion, the invention more effectively acts.

(8) In the prism unit according to (7), the composite prism is a color separation prism or a color synthesis prism that includes the first and second prism blocks bonded to each other so as to form an air layer in a region including the optical axis, and the first prism block is formed of one prism and the second prism block is formed of two prisms bonded to each other.

According to this aspect, the composite prism forms a color separation prism or a color synthesis prism. In this case, the composite prism is built in, for example, a 3-plate type camera and can be used to separate the color of incident light.

(9) In the prism unit according to (7) or (8), the first and second prism blocks of the composite prism are bonded to each other with a spacer interposed therebetween in a region other than the region including the optical axis.

According to this aspect, the first and second prism blocks are bonded to each other with a spacer interposed therebetween in a region other than the region including the optical axis. Accordingly, an air layer having a constant thickness can be easily formed in the bonding portion.

According to the invention, a prism unit can stably support a composite prism and can be made to have a structure strong against a change in temperature.

BRIEF DESCRIPTION OF THE DRAWINGS

FIGS. 11A and 11B are views showing other embodiments of a spacer.

FIG. 12 is a table showing results of verification experiments about effects.

DESCRIPTION OF THE PREFERRED EMBODIMENTS

Preferred embodiments of the invention will be described in detail below with reference to accompanying drawings.

First Embodiment

<Structure>

Figure 1:
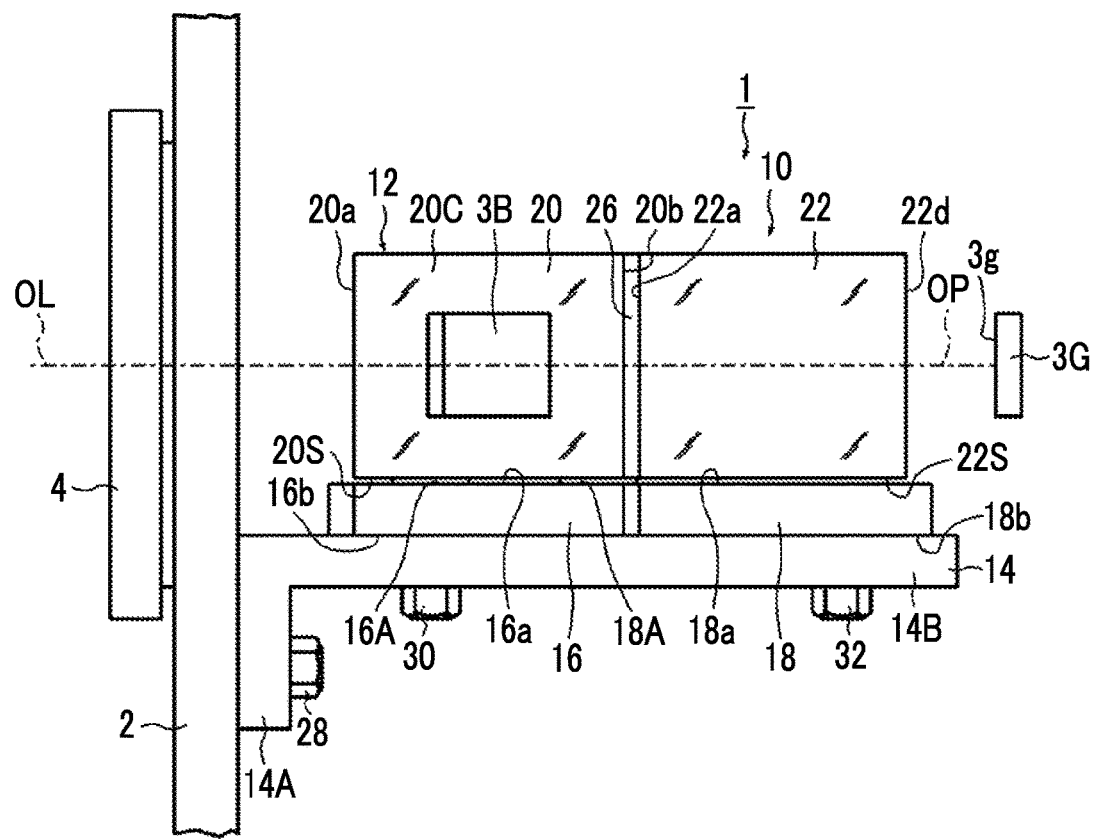
FIG. 1 is a side view showing the schematic structure of a 3-plate type camera in which a prism unit according to the invention is built.
Figure 2:
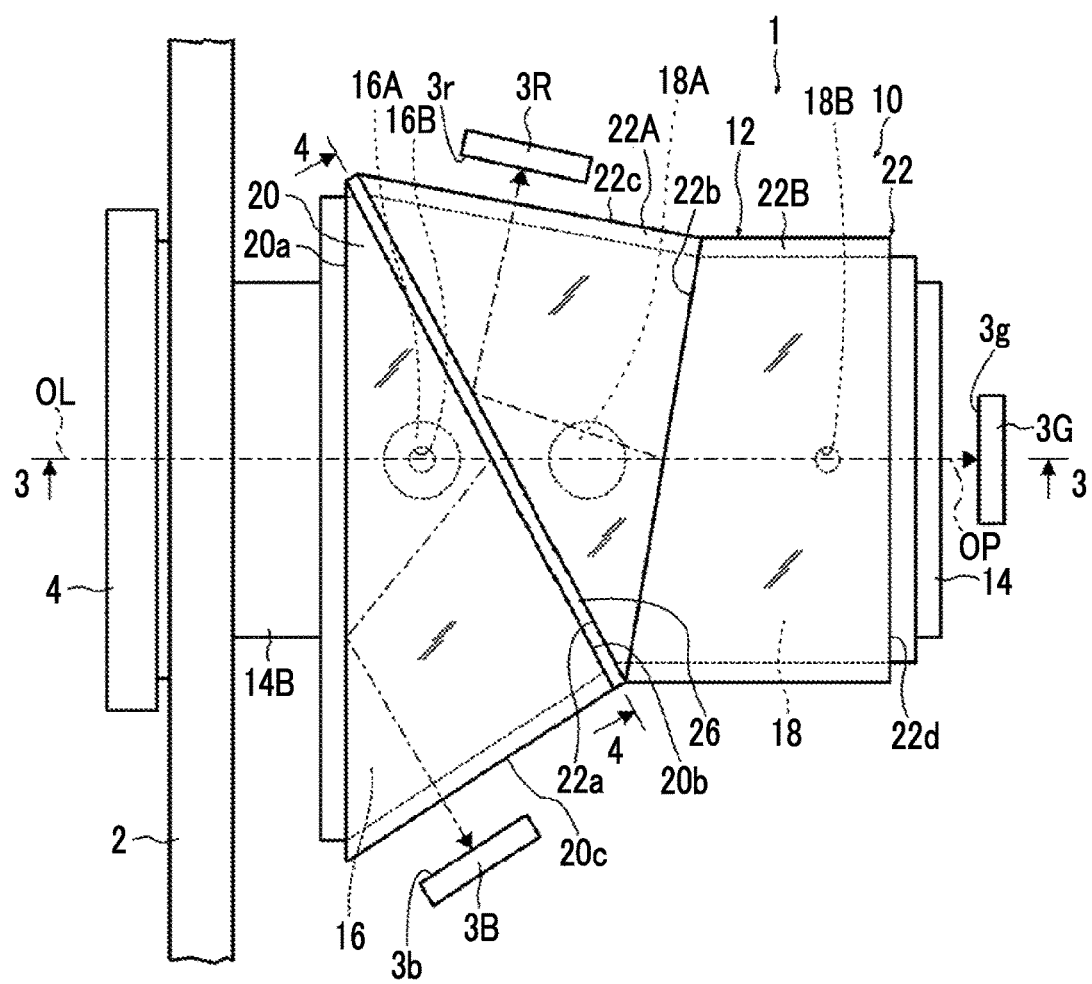
FIG. 2 is a plan view showing the schematic structure of the 3-plate type camera in which the prism unit according to the invention is built.
Figure 3:
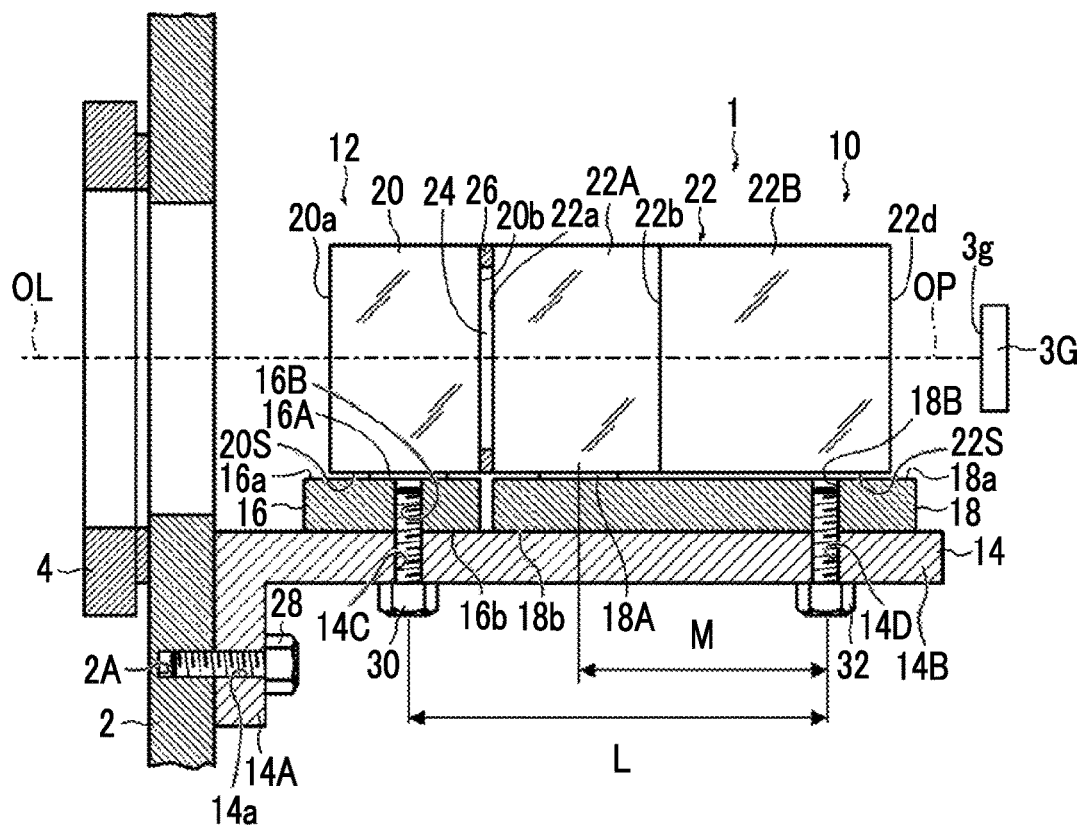
FIG. 3 is a cross-sectional view taken along line 3-3 of FIG. 2.

FIG. 1 is a side view showing the schematic structure of a 3-plate type camera in which a prism unit according to the invention is built, and FIG. 2 is a plan view showing the schematic structure of the 3-plate type camera in which the prism unit according to the invention is built. Further, FIG. 3 is a cross-sectional view taken along line 3-3 of FIG. 2.

The 3-plate type camera 1 separates light, which has passed through an imaging lens (not shown), into light having three colors, that is, red (R) light, green (G) light, and blue (B) light; and receives the red (R) light, the green (G) light, and the blue (B) light by three imaging elements 3R, 3G, and 3B, respectively. The imaging lens is mounted on a lens mount 4 that is included in a camera body 2. A prism unit 10 functions as color separation means for dividing the light, which has passed through the imaging lens, into light having three colors, that is, red (R) light, green (G) light, and blue (B) light.

The prism unit 10 mainly includes a color separation prism 12, a base 14 that supports the color separation prism 12, and a first base plate 16 and a second base plate 18 that are used to mount the color separation prism 12 on the base 14.

[Color separation prism]

The color separation prism 12 is a composite prism, and includes a plurality of prisms that are made of glass and are bonded to each other. The color separation prism 12 of this embodiment includes a first prism block 20 and a second prism block 22 that are bonded to each other.

The first prism block 20 includes one prism. The first prism block 20 includes an imaging light-incident surface 20a, a blue light-reflecting surface 20b, and a blue light-emitting surface 20c.

The imaging light-incident surface 20a is disposed perpendicular to an optical axis OL of the imaging lens. Light, which has passed through the imaging lens, is incident on the imaging light-incident surface 20a.

The blue light-reflecting surface 20b includes a dichroic film that reflects only blue light. Only blue light of the light, which is incident from the imaging light-incident surface 20a, is reflected by the blue light-reflecting surface 20b and the rest thereof is transmitted through the blue light-reflecting surface 20b.

The blue light, which is reflected by the blue light-reflecting surface 20b, is totally reflected by the imaging light-incident surface 20a, and is emitted from the blue light-emitting surface 20c. The blue light, which is emitted from the blue light-emitting surface 20c, is received by a light-receiving surface 3b of an imaging element 3B that receives blue light.

The second prism block 22 includes two prisms 22A and 22B that are integrally bonded to each other. The second prism block 22 includes an incident surface 22a, a red light-reflecting surface 22b, a red light-emitting surface 22c, and a green light-emitting surface 22d.

The incident surface 22a is disposed so as to face the blue light-reflecting surface 20b of the first prism block 20 with a constant interval therebetween. The light, which has been transmitted through the blue light-reflecting surface 20b of the first prism block 20, is incident on the incident surface 22a of the second prism block 22.

The red light-reflecting surface 22b is formed of a bonding surface between the two prisms 22A and 22B of the second prism block 22. Bonding of the two prisms 22A and 22B is gapless bonding, and the bonding surfaces of the prisms 22A and 22B are bonded to each other without a gap. A dichroic film, which reflects only red light, is provided on the bonding surface of one prism 22A of the two prisms 22A and 22B. Only red light of the light, which is incident on the incident surface 22a, is reflected by the red light-reflecting surface 22b and the rest thereof is transmitted through the red light-reflecting surface 22b.

The red light, which is reflected by the red light-reflecting surface 22b, is totally reflected by the incident surface 22a, and is emitted from the red light-emitting surface 22c. The red light, which is emitted from the red light-emitting surface 22c, is received by a light-receiving surface 3r of an imaging element 3R that receives red light.

The light, which has been transmitted through the red light-reflecting surface 22b, is emitted from the green light-emitting surface 22d as green light. The green light, which is emitted from the green light-emitting surface 22d, is received by a light-receiving surface 3g of an imaging element 3G that receives green light.

An air layer 24 is provided between the blue light-reflecting surface 20b of the first prism block 20 and the incident surface 22a of the second prism block 22. The air layer 24 is provided to totally reflect the light that is reflected by the red light-reflecting surface 22b of the second prism block 22.

In a case in which a line passing through the centers of the light-receiving surfaces 3r, 3b, and 3g of the adjacent imaging elements 3R, 3G, and 3B and perpendicular to the light-receiving surfaces 3r, 3g, and 3b is referred to as an optical axis OP, the first and second prism blocks 20 and 22 are bonded to each other so that the air layer 24 is formed in a region including the optical axis OP. The first and second prism blocks 20 and 22 are bonded to each other with a spacer 26 interposed therebetween.

Figure 4:
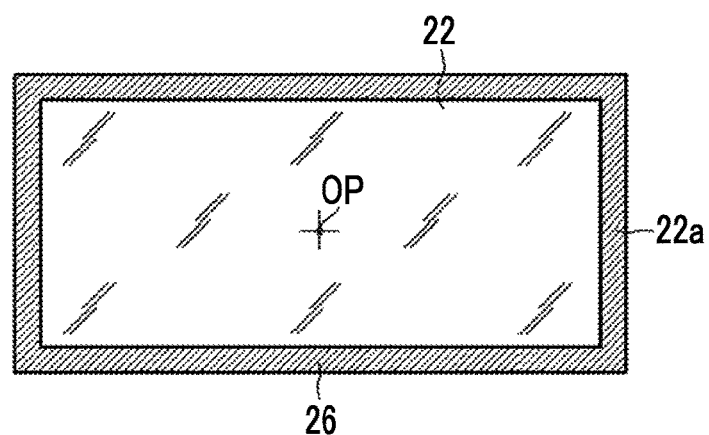
FIG. 4 is a cross-sectional view of a bonding portion between a first prism block and a second prism block.

FIG. 4 is a cross-sectional view of a bonding portion between the first prism block and the second prism block, and is a cross-sectional view taken along line 4-4 of FIG. 2.

As shown in FIG. 4, the spacer 26 has the shape of a frame having a constant thickness and is disposed in a region other than a region including the optical axis OP. Accordingly, the first and second prism blocks 20 and 22 are bonded to each other so that the air layer 24 is formed in the region including the optical axis OP. An adhesive is applied to both surfaces of the spacer 26 so as to have a constant thickness and the spacer 26 is adhered to the blue light-reflecting surface 20b of the first prism block 20 and the incident surface 22a of the second prism block 22, so that the first and second prism blocks 20 and 22 are bonded to each other.

Since the blue light-reflecting surface 20b of the first prism block 20 and the incident surface 22a of the second prism block 22 are bonded to each other with the spacer 26 interposed therebetween, the first and second prism blocks 20 and 22 are integrated with each other. As a result, one color separation prism 12 is formed.

Each of the imaging elements 3R, 3G, and 3B is an example of an image forming panel, and is mounted on the color separation prism 12 by a holder (not shown). Each of the imaging elements 3R, 3G, and 3B is disposed so as to face the corresponding emitting surface, and is disposed so that light passing through the optical axis of the imaging lens is incident on the centers of the light-receiving surfaces 3r, 3g, and 3b as the surfaces of the panels so as to be perpendicular to the light-receiving surfaces 3r, 3g, and 3b. Each of the imaging elements 3R, 3G, and 3B is formed of, for example, an image sensor, such as a charged coupled device (CCD) or a complementary metal oxide semiconductor (CMOS).

[Base]

As shown in FIGS. 1 to 3, the base 14 is mounted on the camera body 2 and functions as a member that supports the color separation prism 12 in the camera body 2. The base 14 has an L shape, and includes a leg portion 14A and a prism support portion 14B.

The leg portion 14A is a portion that is used to fix the base 14 to the camera body 2. The leg portion 14A includes a bolt insertion hole 14a. The bolt insertion hole 14a is formed of a through hole, and is provided in parallel to the prism support portion 14B. A base fixing bolt 28 is inserted into the bolt insertion hole 14a, so that the base 14 is bolted to the camera body 2. The camera body 2 includes bolt holes 2A that are used to bolt the base 14.

The prism support portion 14B is a portion that is used to support the color separation prism 12. The prism support portion 14B has the shape of a rectangular flat plate.

When the leg portion 14A of the base 14 is bolted to the camera body 2, the support portion 14B is disposed in parallel to the optical axis OL of the imaging lens.

[First Base Plate and Second Base Plate]

The first and second base plates 16 and 18 are members that are used to mount the color separation prism 12 on the base 14. The first base plate 16 is mounted on the first prism block 20 of the color separation prism 12. The second base plate 18 is mounted on the second prism block 22 of the color separation prism 12.

Figure 5:
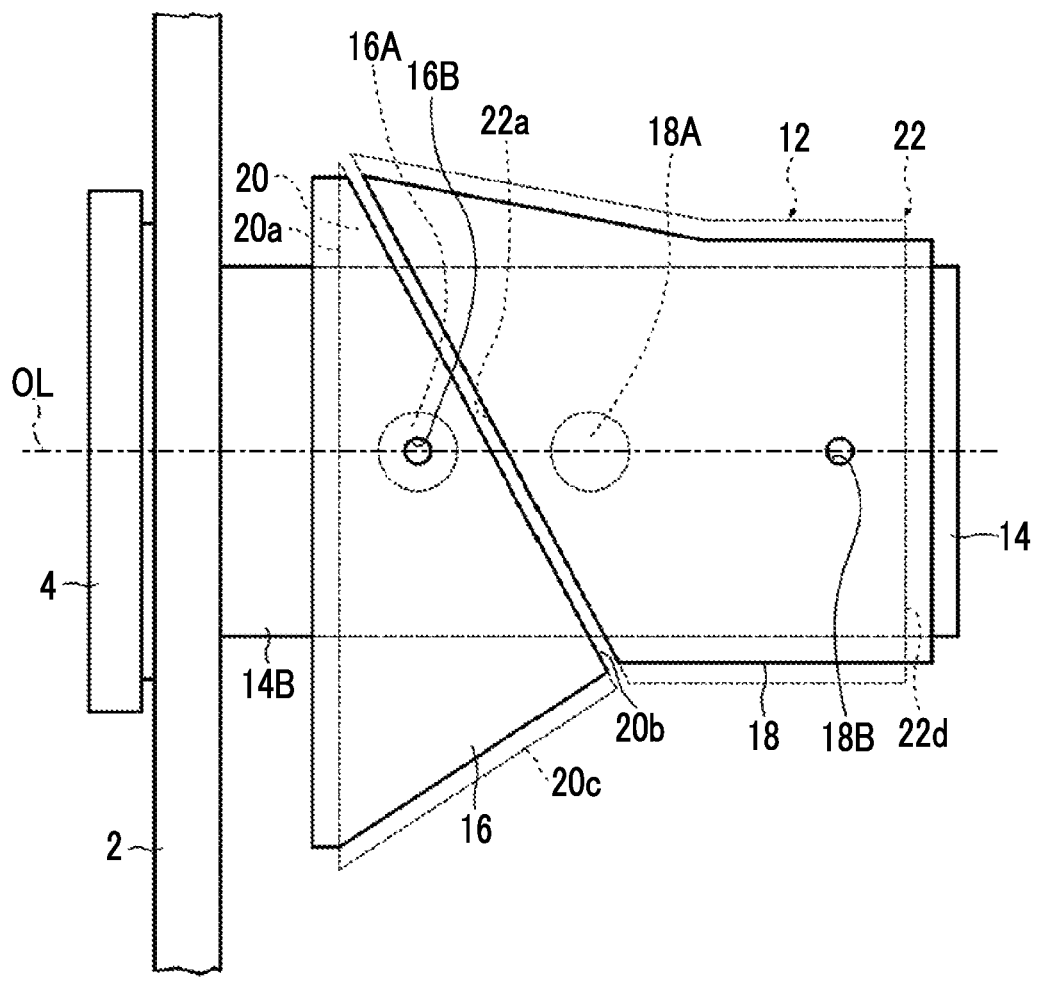
FIG. 5 is a plan view of a first base plate and a second base plate that are mounted on a base.

FIG. 5 is a plan view of the first and second base plates that are mounted on the base.

The first base plate 16 has the shape of a flat plate, and includes a flat first prism-adhesive surface 16a and a flat first base-fixing surface 16b. The first base plate 16 has an outer shape substantially corresponding to the shape of a base plate-installation surface 20S of the first prism block 20.

The second base plate 18 has the shape of a flat plate having the same thickness as the first base plate 16, and includes a flat second prism-adhesive surface 18a and a flat second base-fixing surface 18b. The second base plate 18 has an outer shape substantially corresponding to the shape of a base plate-installation surface 22S of the second prism block 22.

A first adhesive portion 16A, which is used to mount the first prism block 20 of the color separation prism 12, is provided on the first prism-adhesive surface 16a of the first base plate 16. The first adhesive portion 16A is formed as a portion to which an adhesive is to be applied. An adhesive is applied to the first adhesive portion 16A of the first base plate 16 so as to have a constant thickness, and the first base plate 16 is mounted on the base plate-installation surface 20S of the first prism block 20. Accordingly, the first prism block 20 and the first base plate 16 are integrated with each other.

A second adhesive portion 18A, which is used to mount the second prism block 22 of the color separation prism 12, is provided on the second prism-adhesive surface 18a of the second base plate 18. The second adhesive portion 18A is formed as a portion to which an adhesive is to be applied. An adhesive is applied to the second adhesive portion 18A of the second base plate 18 so as to have a constant thickness, and the second base plate 18 is mounted on the base plate-installation surface 22S of the second prism block 22. Accordingly, the second prism block 22 and the second base plate 18 are integrated with each other.

The first and second base plates 16 and 18, which are mounted on the color separation prism 12, are mounted on the color separation prism 12 with a constant gap therebetween.

A first base-fixing portion 16B, which is used to mount the first base plate 16 on the base 14, is provided on the first base-fixing surface 16b of the first base plate 16. The first base-fixing portion 16B is formed of a bolt hole.

A second base-fixing portion 18B, which is used to mount the second base plate 18 on the base 14, is provided on the second base-fixing surface 18b of the second base plate 18. The second base-fixing portion 18B is formed of a bolt hole.

The base 14 includes a first base plate-fixing portion 14C that is used to mount the first base plate 16 and a second base plate-fixing portion 14D that is used to mount the second base plate 18. The first and second base plate-fixing portions 14C and 14D are provided in the prism support portion 14B of the base 14, and are formed of through holes, respectively. A first bolt 30 is inserted into the first base plate-fixing portion 14C and is screwed to the first base-fixing portion 16B, so that the first base plate 16 is fixed to the base 14. Further, a second bolt 32 is inserted into the second base plate-fixing portion 14D and is screwed to the second base-fixing portion 18B, so that the second base plate 18 is fixed to the base 14.

[Disposition of Respective Portions]

When the base 14 is mounted on the camera body 2, the first and second base plate-fixing portions 14C and 14D are disposed on a straight line parallel to the optical axis OL of the imaging lens.

Further, the first base-fixing portion 16B, the second base-fixing portion 18B, the first adhesive portion 16A, and the second adhesive portion 18A are disposed on the same straight line, and are disposed on a straight line passing through the center of the first base plate-fixing portion 14C and the center of the second base plate-fixing portion 14D when the first and second base plates 16 and 18 are mounted on the base 14.

Accordingly, when the base 14 is mounted on the camera body 2, the respective portions, that is, all of the first base plate-fixing portion 14C, the second base plate-fixing portion 14D, the first base-fixing portion 16B, the second base-fixing portion 18B, the first adhesive portion 16A, and the second adhesive portion 18A are disposed on one straight line parallel to the optical axis OL of the imaging lens.

Furthermore, the first adhesive portion 16A is disposed coaxially with the first base-fixing portion 16B. Accordingly, when the first base plate 16 is mounted on the base 14, the first adhesive portion 16A, the first base-fixing portion 16B, and the first base plate-fixing portion 14C are disposed coaxially with each other. Since the first adhesive portion 16A and the first base-fixing portion 16B are disposed coaxially with each other in this way, it is possible to reduce an influence that is caused by the thermal deformation of the first base plate 16. A range in which it is regarded that elements are disposed coaxially with each other includes a fixed allowable range, and includes a range in which it is regarded that elements are disposed substantially coaxially with each other. This range is set to a range in which a difference between the position of the center of the first adhesive portion 16A and the position of the center of the first base-fixing portion 16B is within ±5 mm. In this range, it can be regarded that elements are disposed substantially coaxially with each other and an influence caused by the thermal deformation of the first base plate 16 can be further reduced.

Further, the second adhesive portion 18A is disposed between the first base plate-fixing portion 14C and the second base plate-fixing portion 14D. Accordingly, a direction in which the second base plate-fixing portion 14D is displaced from the first base plate-fixing portion 14C and a direction in which the second adhesive portion 18A is displaced from the second base-fixing portion 18B are opposite to each other in a case in which the base 14 and the second base plate 18 expand or contract due to a change in temperature. Therefore, since an increase and a reduction in the interval of the bonding portion between the first and second prism blocks 20 and 22 of the color separation prism 12, which are caused by a change in temperature, can be suppressed, the peeling of the bonding portion can be prevented.

Particularly, the prism unit 10 of this embodiment is adapted to satisfy the following conditions. That is, in a case in which the linear expansion coefficient of the base 14 is denoted by $\alpha$, the equivalent linear expansion coefficient of the second base plate 18 is denoted by $\beta$, the equivalent linear expansion coefficient of the color separation prism 12 as a composite prism is denoted by $\gamma$, a distance between the first and second base plate-fixing portions 14C and 14D is denoted by L mm, a distance between the second base-fixing portion 18B and the second adhesive portion 18A is denoted by M mm, and a change in the temperature of the prism unit 10 up to 70° C. from 25° C. is denoted by $\Delta T$° C. as shown in FIG. 3, the prism unit 10 of this embodiment is adapted to satisfy the relationship of "$\alpha < \beta$ and $-4 \times 10^{-4} \leq \alpha L \Delta T - \beta M \Delta T - \gamma (L-M) \Delta T \leq 4 \times 10^{-4}$". Accordingly, since an increase and a reduction in the interval of the bonding portion, which are caused by a change in temperature, can be more appropriately suppressed, the peeling of the bonding portion can be prevented.

Here, "$\alpha L \Delta T - \beta M \Delta T - \gamma (L-M) \Delta T$" of the conditions of "$\alpha < \beta$ and $-4 \times 10^{-4} \leq \alpha L \Delta T - \beta M \Delta T - \gamma (L-M) \Delta T \leq 4 \times 10^{-4}$" represents a change in the interval of the bonding portion between the first and second prism blocks 20 and 22 when a change in temperature is received. It is possible to prevent the peeling of the bonding portion between the first and second prism blocks 20 and 22, which is caused by a change in temperature, by setting materials and the disposition of the respective fixing portions and the respective adhesive portions so that this change in the interval is within a predetermined allowable range, that is, the range of $\pm 4\times 10^{-4}$ mm.

The allowable range of the change in the interval is determined according to the bonding strength of the bonding portion between the first and second prism blocks 20 and 22, and is more preferably $\pm 1\times 10^{-4}$ mm and still more preferably $\pm 5\times 10^{-5}$ mm. The bonding strength of the bonding portion is changed according to the viscosity or adhesive area of an adhesive to be used at the time of bonding, and the bonding strength of the bonding portion becomes high with an increase in the viscosity of an adhesive, and becomes high with an increase in the adhesive area.

Here, in order to satisfy the conditions of "$\alpha < \beta$ and $-4\times 10^{-4} \leq \alpha L \Delta T - \beta M \Delta T - \gamma(L-M)\Delta T \leq 4\times 10^{-4}$", the materials of the base 14 and the first and second base plates 16 and 18 are appropriately selected other than the adjustment of the disposition of the respective portions, that is, the first base plate-fixing portion 14C, the second base plate-fixing portion 14D, the first base-fixing portion 16B, the second base-fixing portion 18B, the first adhesive portion 16A, and the second adhesive portion 18A.

The base 14 can be made of, for example, an aluminum alloy. It is preferable that the first base plate 16 is made of a material having a linear expansion coefficient equal to the equivalent linear expansion coefficient of the color separation prism 12. Accordingly, the peeling of the adhesive portions from the color separation prism 12 can be effectively prevented. "Equal" mentioned here includes a range in which the linear expansion coefficient is approximated to the equivalent linear expansion coefficient other than a case in which the linear expansion coefficient is completely the same as the equivalent linear expansion coefficient. That is, "equal" mentioned here includes the range of "substantially equal". In terms of the prevention of the peeling of the adhesive portions, the reason for this is that the peeling of the adhesive portions can be effectively prevented if the first base plate 16 has a linear expansion coefficient substantially equal to the equivalent linear expansion coefficient of the color separation prism 12. In the case of the color separation prism made of glass, the first base plate 16 can be made of, for example, ceramics or titanium. Further, the camera body 2 can be made of, for example, an aluminum alloy.

In a case in which the second base plate 18 is made of a single material, the equivalent linear expansion coefficient of the second base plate 18 is the linear expansion coefficient of the material. In a case in which the second base plate 18 is made of two or more different materials, the equivalent linear expansion coefficient of the second base plate 18 is an average value of the linear expansion coefficients of the materials. Since the second base plate 18 is made of a single material in this embodiment, the equivalent linear expansion coefficient of the second base plate 18 is the linear expansion coefficient of the material of the second base plate 18.

Likewise, in a case in which the color separation prism 12 is formed of a prism made of a single material, the equivalent linear expansion coefficient $\gamma$ of the color separation prism 12 as a composite prism is the linear expansion coefficient of the material. In a case in which the color separation prism 12 is formed of a prism made of different materials, the equivalent linear expansion coefficient $\gamma$ of the color separation prism 12 is an average value of the linear expansion coefficients of the materials. Since each prism forming the color separation prism 12 is made of a single material (glass) in this embodiment, the equivalent linear expansion coefficient $\gamma$ is the linear expansion coefficient of the prism forming the color separation prism 12. In this case, the equivalent linear expansion coefficient of the first prism block 20 and the equivalent linear expansion coefficient of the second prism block 22 are also the linear expansion coefficient of the material of the prism.

<Action>

When the color separation prism 12 is mounted on the base 14 with the first and second base plates 16 and 18 interposed therebetween and the base 14 is assembled to the camera body 2 as shown in FIGS. 1 to 3, the color separation prism 12 is disposed on the optical axis OL of the imaging lens. Accordingly, the imaging element 3G receiving green light is disposed on the optical axis OL of the imaging lens.

Light, which has been transmitted through the imaging lens, is incident on the imaging light-incident surface 20a of the color separation prism 12. The light, which is incident on the imaging light-incident surface 20a, is divided into light having three colors, that is, red (R) light, green (G) light, and blue (B) light in the color separation prism 12. Further, the red light is emitted from the red light-emitting surface 22c and is received by the light-receiving surface 3r of the imaging element 3R receiving red light, the green light is emitted from the green light-emitting surface 22d and is received by the light-receiving surface 3g of the imaging element 3G receiving green light, and the blue light is emitted from the blue light-emitting surface 20c and is received by the light-receiving surface 3b of the imaging element 3B receiving blue light. Accordingly, the optical image of a subject, which has passed through the imaging lens, is taken.

Incidentally, when a power source is turned on, various devices installed in the camera body 2 of the 3-plate type camera 1 generate heat and the internal temperature of the camera body 2 rises. When the internal temperature of the camera body 2 rises, the base 14, which is a support portion for the color separation prism 12, and the first and second base plates 16 and 18 are thermally deformed. When the base 14 and the first and second base plates 16 and 18 are thermally deformed, the prism unit 10 of this embodiment acts as follows.

That is, when the base 14 expands due to a temperature rise, the second base plate-fixing portion 14D is displaced in a direction in which the second base plate-fixing portion 14D becomes distant from the first base plate-fixing portion 14C. As a result, the second adhesive portion 18A is displaced in a direction in which the second adhesive portion 18A becomes distant from the first adhesive portion 16A.

On the other hand, when the second base plate 18 expands due to a temperature rise, the second adhesive portion 18A is displaced in a direction in which the second adhesive portion 18A becomes distant from the second base plate-fixing portion 14D. This direction is a direction opposite to a direction in which the second adhesive portion 18A is displaced due to the expansion of the base 14, and is a direction approaching the first adhesive portion 16A.

That is, since the second base plate 18 is displaced so as to offset the displacement of the base 14 when temperature is changed, an interval between the first and second adhesive portions 16A and 18A can be always maintained constant. Accordingly, since a force acting between the first and second prism blocks 20 and 22 of the color separation prism 12 can be offset, the peeling of the bonding portion from the first and second prism blocks 20 and 22 can be prevented.

Further, since both the first and second prism blocks 20 and 22 are supported in the prism unit 10 of this embodiment, the color separation prism 12 can be supported in a stable state.

Furthermore, since the first and second adhesive portions 16A and 18A are disposed close to each other in the prism unit 10 of this embodiment, an influence of thermal expansion can be minimized.

Second Embodiment

<Structure>

Figure 6:
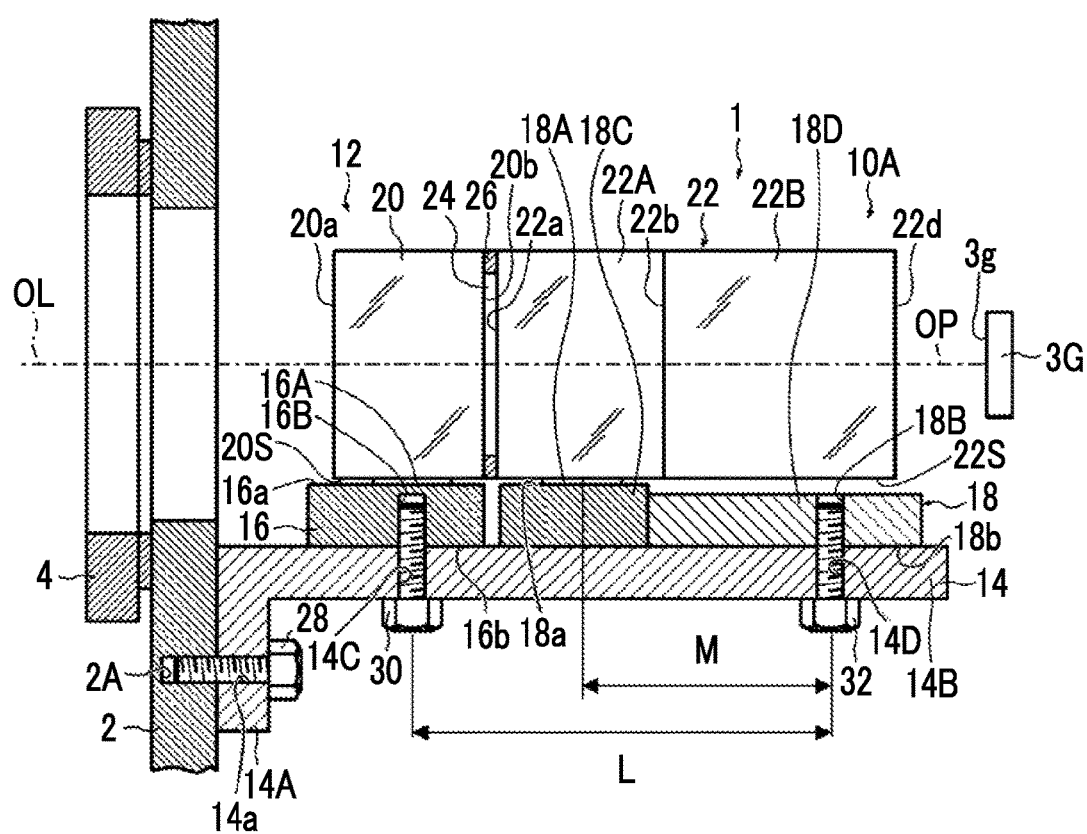
FIG. 6 is a side cross-sectional view showing the schematic structure of a second embodiment of the 3-plate type camera in which the prism unit according to the invention is built.

FIG. 6 is a side cross-sectional view showing the schematic structure of a second embodiment of the 3-plate type camera in which the prism unit according to the invention is built. Further, FIG. 7 is a plan view of first and second base plates that are mounted on the base.

Figure 7:
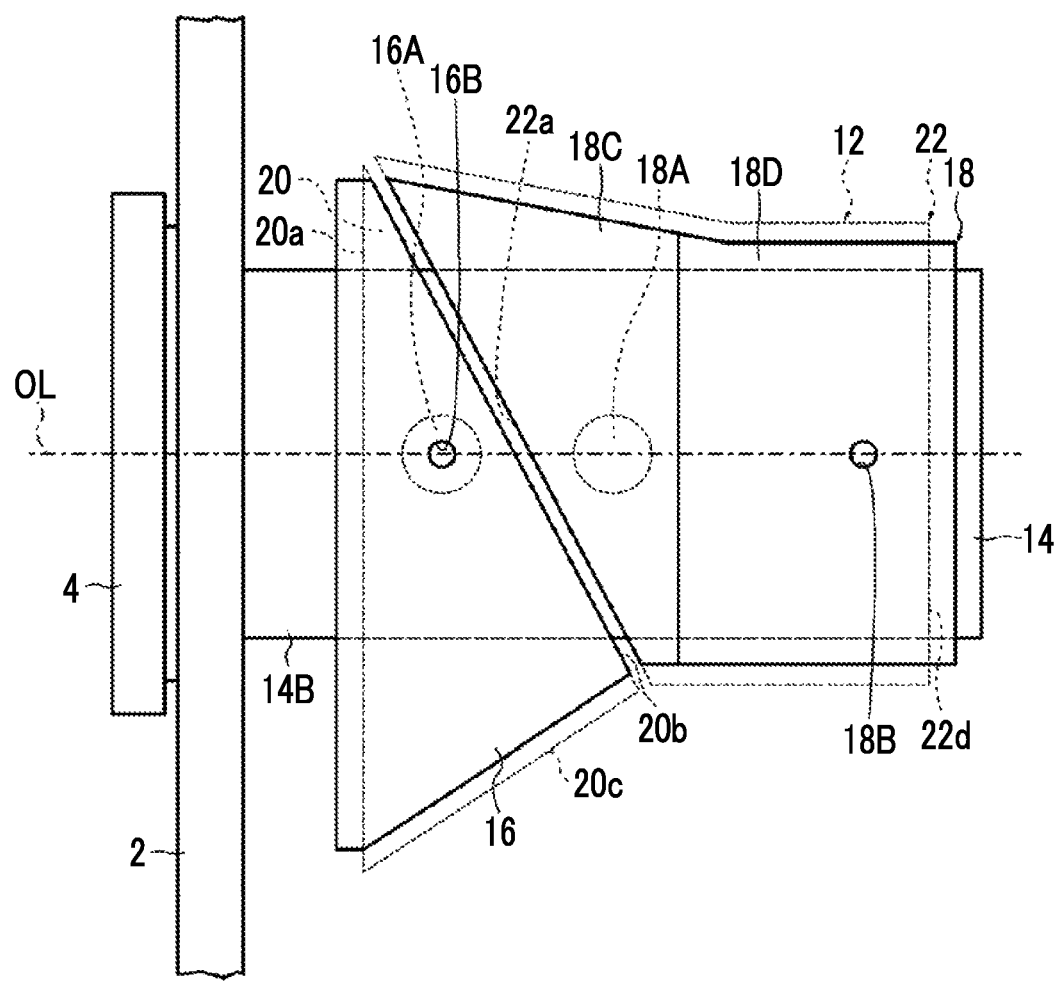
FIG. 7 is a plan view of first and second base plates that are mounted on the base.

As shown in FIGS. 6 and 7, the second base plate 18 of a prism unit 10A of this embodiment includes a first component 18C and a second component 18D that are bonded to each other. The structure of the prism unit 10A of this embodiment is the same as the structure of the prism unit 10 of the first embodiment except that the structure of the second base plate 18 is different from that of the second base plate 18 of the first embodiment. Accordingly, only the structure of the second base plate 18 and the functional effects thereof will be described here.

As described above, the second base plate 18 of the prism unit 10A of this embodiment includes the first and second components 18C and 18D that are bonded to each other.

The first component 18C includes a second adhesive portion 18A, and has a linear expansion coefficient equal to the linear expansion coefficient of the first base plate 16. Further, the first component 18C has the same thickness as the first base plate 16. "Equal" mentioned here includes a range in which the linear expansion coefficient is approximated to the equivalent linear expansion coefficient other than a case in which the linear expansion coefficient is completely the same as the equivalent linear expansion coefficient. That is, "equal" mentioned here includes the range of "substantially equal". Likewise, "the same thickness" includes "substantially the same thickness".

The second component 18D includes a second base-fixing portion 18B, and has a linear expansion coefficient higher than the linear expansion coefficient of the base 14. The second component 18D has a thickness slightly larger than the thickness of the first component 18C.

The first and second components 18C and 18D are integrated with each other by being bonded to each other by, for example, an adhesive. The second base plate 18 of which the first and second components 18C and 18D are integrated with each other has an outer shape substantially corresponding to the shape of the base plate-installation surface 22S of the second prism block 22.

<Action>

According to the prism unit 10A of this embodiment, a relationship between the height of the first adhesive portion 16A and the height of the second adhesive portion 18A can be always maintained constant even in a case in which temperature is changed.

The first and second base plates 16 and 18 also expand in a thickness direction due to a change in temperature, but it is possible to make the deformation amount of the first component 18C and the deformation amount of the first base plate 16, which are caused by thermal expansion, correspond to each other by making the linear expansion coefficient of the first component 18C of the second base plate 18 correspond to the linear expansion coefficient of the first base plate 16. Accordingly, even in a case in which temperature is changed, the height of the first adhesive portion 16A can be always the same as the height of the second adhesive portion 18A.

Further, since the height of the first adhesive portion 16A can be always the same as the height of the second adhesive portion 18A, it is possible to prevent stress, which is applied in a direction along the bonding surface, from being applied to the bonding portion of the color separation prism 12. Accordingly, the prism unit can be made to have a structure that is stronger against a change in temperature.

In a case in which the color separation prism 12 is made of glass, the first base plate 16 and the first component 18C of the second base plate 18 can be made of, for example, ceramics or titanium. Accordingly, the peeling of the adhesive portion between the first prism block 20 and the first base plate 16 can be effectively prevented. Further, the peeling of the adhesive portion between the second prism block 22 and the second base plate 18 can be effectively prevented.

Third Embodiment

<Structure>

Figure 8:
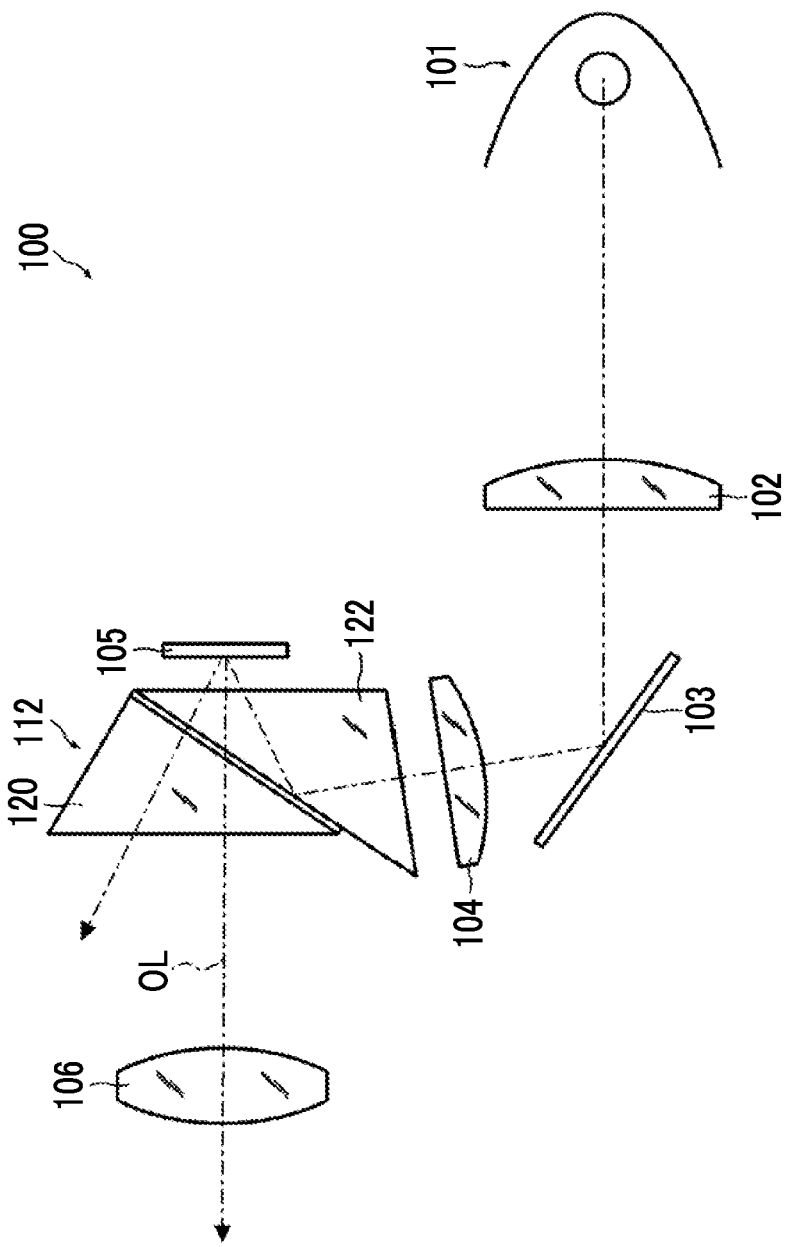
FIG. 8 is a plan view showing the schematic structure of a projection display device in which the prism unit according to the invention is built.

FIG. 8 is a plan view showing the schematic structure of a projection display device in which the prism unit according to the invention is built.

The projection display device 100 shown in FIG. 8 is a projection display device using a reflective light valve, and mainly includes a light source 101, a relay lens 102, a total reflection mirror 103, a field lens 104, a total reflection prism 112, a reflective light valve 105, and a projection lens 106.

Light, which is emitted from the light source 101, is incident on the total reflection mirror 103 through the relay lens 102. Then, the light is totally reflected by the total reflection mirror 103, and is incident on the total reflection prism 112 through the field lens 104.

The total reflection prism 112 is formed of a composite prism, and includes a first prism block 120 and a second prism block 122 that are bonded to each other. The first prism block 120 is formed of a prism as a single body, and the second prism block 122 is formed of a prism as a single body likewise. The first and second prism blocks 120 and 122 are bonded to each other with an air layer interposed therebetween. The light, which is incident on the total reflection prism 112, is totally reflected by the interface of the air layer and is incident on the reflective light valve 105.

The reflective light valve 105 is an example of an image forming panel, and controls the traveling direction of light to be incident on an image forming surface as the surface of the panel and forms an optical image.

Light, which is reflected from the reflective light valve 105, is incident on the projection lens 106 after being transmitted through the total reflection prism 112, and is applied to a screen. Accordingly, the optical image formed on the reflective light valve 105 is enlarged and projected to the screen.

Figure 9:
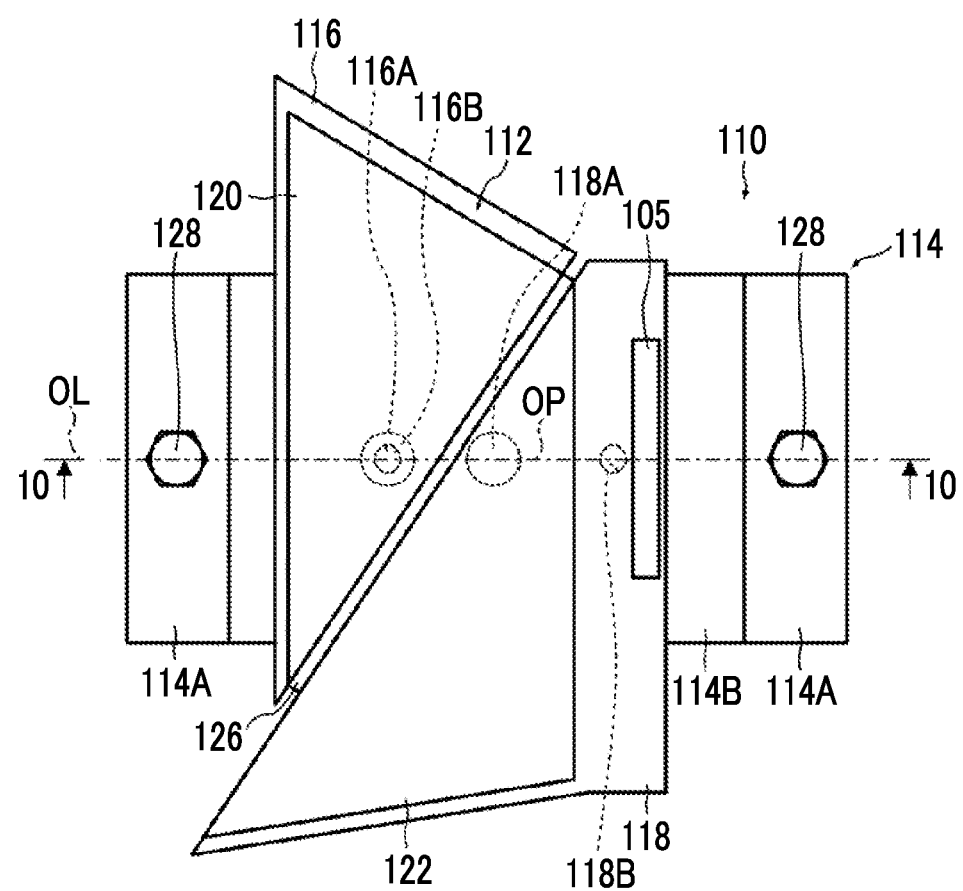
FIG. 9 is a plan view of the prism unit.
Figure 10:
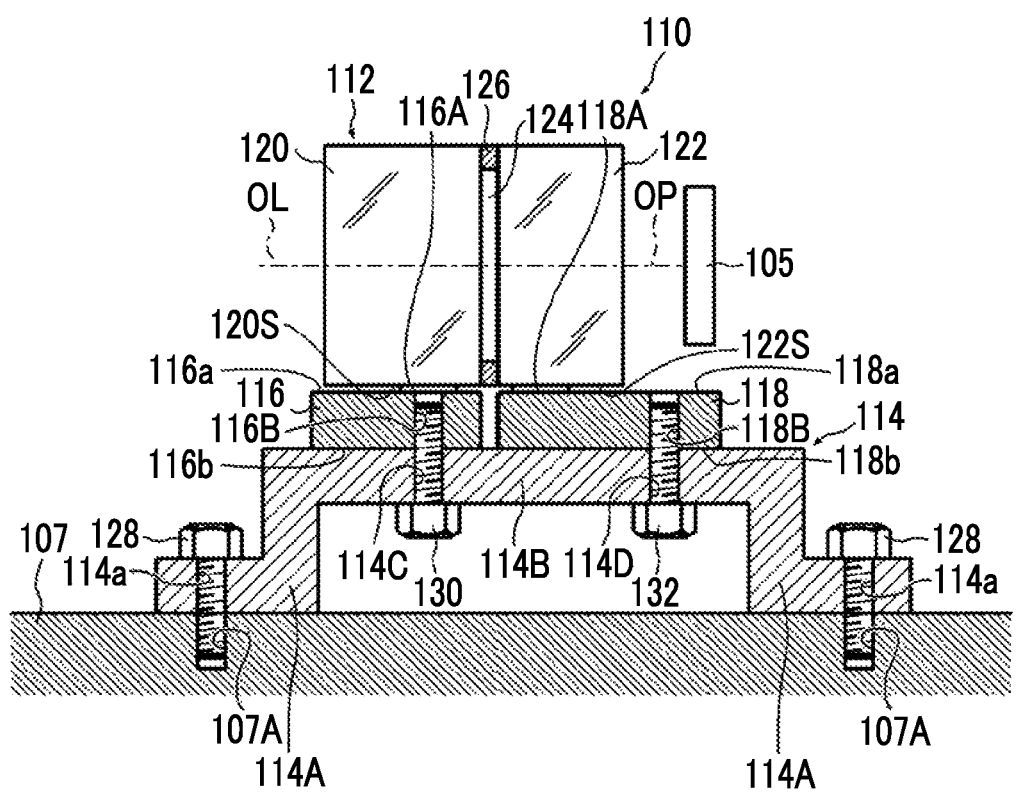
FIG. 10 is a cross-sectional view taken along line 10-10 of FIG. 9.

FIG. 9 is a plan view of the prism unit. Further, FIG. 10 is a cross-sectional view taken along line 10-10 of FIG. 9.

The total reflection prism 112 is assembled to a device body 107 of the projection display device 100 as a prism unit 110.

The prism unit 110 includes the total reflection prism 112, a base 114 that supports the total reflection prism 112, and a first base plate 116 and a second base plate 118 that are used to mount the total reflection prism 112 on the base 114.

[Total Reflection Prism]

As described above, the total reflection prism 112 is a composite prism and includes the first and second prism blocks 120 and 122 that are bonded to each other.

In a case in which a line passing through the center of the image forming surface of the reflective light valve 105 and perpendicular to the image forming surface is set as an optical axis OP, the first and second prism blocks 120 and 122 are bonded to each other so that an air layer 124 is formed in a region including the optical axis. The first and second prism blocks 120 and 122 are bonded to each other with a spacer 126 interposed therebetween. The spacer 126 has the shape of a frame, and is disposed in a region other than the region including the optical axis OP.

[Base]

The base 114 functions as a member that supports the total reflection prism 112 in the device body 107. The base 114 includes a pair of leg portions 114A and a prism support portion 114B.

The pair of leg portions 114A is a portion that is used to fix the base 114 to the device body 107. Each of the leg portions 114A has an L shape, and includes a bolt insertion hole 114a formed of a through hole. A base fixing bolt 128 is inserted into each bolt insertion hole 114a, so that the base 114 is bolted to the device body 107. The device body 107 includes a pair of bolt holes 107A that is used to bolt the base 114.

The prism support portion 114B is a portion that supports the total reflection prism 112. The prism support portion 114B has the shape of a rectangular flat plate.

When the leg portions 114A are bolted to the device body 107, the base 114 is disposed so that the prism support portion 114B is parallel to an optical axis OL of the projection lens 106. The optical axis OL of the projection lens 106 and the optical axis OP correspond to each other. That is, the reflective light valve 105 is installed on the optical axis of the projection lens 106.

[First Base Plate and Second Base Plate]

The first and second base plates 116 and 118 are members that are used to mount the total reflection prism 112 on the base 114. The first base plate 116 is mounted on the first prism block 120 of the total reflection prism 112. The second base plate 118 is mounted on the second prism block 122 of the total reflection prism 112.

FIG. 9 is a plan view of the first and second base plates mounted on the base.

The first base plate 116 has the shape of a flat plate, and includes a flat first prism-adhesive surface 116a and a flat first base-fixing surface 116b.

The second base plate 118 has the shape of a flat plate having the same thickness as the first base plate 116, and includes a flat second prism-adhesive surface 118a and a flat second base-fixing surface 118b.

A first adhesive portion 116A, which is used to mount the first prism block 120 of the total reflection prism 112, is provided on the first prism-adhesive surface 116a of the first base plate 116. The first adhesive portion 116A is formed as a portion to which an adhesive is to be applied. An adhesive is applied to the first adhesive portion 116A of the first base plate 116 so as to have a constant thickness, and the first base plate 116 is mounted on a base plate-installation surface 120S of the first prism block 120. Accordingly, the first prism block 120 and the first base plate 116 are integrated with each other.

A second adhesive portion 118A, which is used to mount the second prism block 122 of the total reflection prism 112, is provided on the second prism-adhesive surface 118a of the second base plate 118. The second adhesive portion 118A is formed as a portion to which an adhesive is to be applied. An adhesive is applied to the second adhesive portion 118A of the second base plate 118 so as to have a constant thickness, and the second base plate 118 is mounted on a base plate 122S of the second prism block 122. Accordingly, the second prism block 122 and the second base plate 118 are integrated with each other.

The first and second base plates 116 and 118, which are mounted on the total reflection prism 112, are mounted on the total reflection prism 112 with a constant gap therebetween.

A first base-fixing portion 116B, which is used to mount the first base plate 116 on the base 114, is provided on the first base-fixing surface 116b of the first base plate 116. The first base-fixing portion 116B is formed of a bolt hole.

A second base-fixing portion 118B, which is used to mount the second base plate 118 on the base 114, is provided on the second base-fixing surface 118b of the second base plate 118. The second base-fixing portion 118B is formed of a bolt hole.

The base 114 includes a first base plate-fixing portion 114C that is used to mount the first base plate 116 and a second base plate-fixing portion 114D that is used to mount the second base plate 118. The first and second base plate-fixing portions 114C and 114D are provided in the prism support portion 14B of the base 114, and are formed of through holes, respectively. A first bolt 130 is inserted into the first base plate-fixing portion 114C and is screwed to the first base-fixing portion 116B, so that the first base plate 116 is fixed to the base 114. Further, a second bolt 132 is inserted into the second base plate-fixing portion 114D and is screwed to the second base-fixing portion 118B, so that the second base plate 118 is fixed to the base 114.

[Disposition of Respective Portions]

When the base 114 is mounted on the device body 107, the first and second base plate-fixing portions 114C and 114D are disposed on a straight line parallel to the optical axis OL of the projection lens 106.

Further, the first base-fixing portion 116B, the second base-fixing portion 118B, the first adhesive portion 116A, and the second adhesive portion 118A are disposed on the same straight line, and are disposed on a straight line passing through the center of the first base plate-fixing portion 114C and the center of the second base plate-fixing portion 114D when the first and second base plates 116 and 118 are mounted on the base 114.

Accordingly, when the base 114 is mounted on the device body 107, the respective portions, that is, all of the first base plate-fixing portion 114C, the second base plate-fixing portion 114D, the first base-fixing portion 116B, the second base-fixing portion 118B, the first adhesive portion 116A, and the second adhesive portion 118A are disposed on one straight line parallel to the optical axis OL of the projection lens 106.

Furthermore, the first adhesive portion 116A is disposed coaxially with the first base-fixing portion 116B. Accordingly, when the first base plate 116 is mounted on the base 114, the first adhesive portion 116A, the first base-fixing portion 116B, and the first base plate-fixing portion 114C are disposed coaxially with each other.

Further, the second adhesive portion 118A is disposed between the first base plate-fixing portion 114C and the second base plate-fixing portion 114D. Accordingly, a direction in which the second base plate-fixing portion 114D is displaced from the first base plate-fixing portion 114C and a direction in which the second adhesive portion 118A is displaced from the second base-fixing portion 118B are opposite to each other in a case in which the base 114 and the second base plate 118 expand or contract due to a change in temperature. Therefore, since an increase and a reduction in the interval of the bonding portion between the first and second prism blocks 120 and 122 of the total reflection prism 112, which are caused by a change in temperature, can be suppressed, the peeling of the bonding portion can be prevented.

Particularly, the prism unit 110 of this embodiment is adapted to satisfy the following conditions. That is, in a case in which the linear expansion coefficient of the base 114 is denoted by $\alpha$, the equivalent linear expansion coefficient of the total reflection prism 112 as a composite prism is denoted by $\gamma$, the equivalent linear expansion coefficient of the second base plate 118 is denoted by $\beta$, a distance between the first and second base plate-fixing portions 114C and 114D is denoted by L mm, a distance between the second base-fixing portion 118B and the second adhesive portion 118A is denoted by M mm, and a change in the temperature of the prism unit 110 up to 70° C. from 25° C. is denoted by $\Delta T$° C. as shown in FIG. 3, the prism unit 110 of this embodiment is adapted to satisfy the relationship of "$\alpha<\beta$ and $-4\times10^{-4}\leq\alpha L\Delta T-\beta M\Delta T-\gamma(L-M)\Delta T\leq4\times10^{-4}$". Accordingly, since an increase and a reduction in the interval of the bonding portion, which are caused by a change in temperature, can be more appropriately suppressed, the peeling of the bonding portion can be prevented.

Here, "$\alpha L\Delta T-\beta M\Delta T-\gamma(L-M)\Delta T$" of the conditions of "$\alpha<\beta$ and $-4\times10^{-4}\leq\alpha L\Delta T-\beta M\Delta T-\gamma(L-M)\Delta T\leq4\times10^{-4}$" represents a change in the interval of the bonding portion between the first and second prism blocks 120 and 122 when a change in temperature is received. It is possible to prevent the peeling of the bonding portion between the first and second prism blocks 120 and 122, which is caused by a change in temperature, by setting materials and the disposition of the respective fixing portions and the respective adhesive portions so that this change in the interval is within a predetermined allowable range, that is, the range of $\pm4\times10^{-4}$.

The allowable range of the change in the interval is determined according to the bonding strength of the bonding portion between the first and second prism blocks 120 and 122, and is more preferably $\pm1\times10^{-4}$ and still more preferably $\pm5\times10^{-5}$. The bonding strength of the bonding portion is changed according to the viscosity or adhesive area of an adhesive to be used at the time of bonding, and the bonding strength of the bonding portion becomes high with an increase in the viscosity of an adhesive, and becomes high with an increase in the adhesive area.

In order to satisfy the conditions of "$\alpha<\beta$ and $-4\times10^{-4}\leq\alpha L\Delta T-\beta M\Delta T-\gamma(L-M)\Delta T\leq4\times10^{-4}$", the materials of the base 114 and the first and second base plates 116 and 118 are appropriately selected other than the adjustment of the disposition of the respective portions, that is, the first base plate-fixing portion 114C, the second base plate-fixing portion 114D, the first base-fixing portion 116B, the second base-fixing portion 118B, the first adhesive portion 116A, and the second adhesive portion 118A.

The base 114 can be made of, for example, an aluminum alloy. It is preferable that the first and second base plate 116 and 118 are made of a material having a linear expansion coefficient equal to the linear expansion coefficient of the total reflection prism 112. Accordingly, the peeling of the adhesive portions from the total reflection prism 112 can be effectively prevented. "Equal" mentioned here includes a range in which the linear expansion coefficient of the material of each of the first and second base plate 116 and 118 is approximated to the linear expansion coefficient of the total reflection prism 112 other than a case in which the linear expansion coefficient of the material of each of the first and second base plate 116 and 118 is completely the same as the linear expansion coefficient of the total reflection prism 112. That is, "equal" mentioned here includes the range of "substantially equal". In terms of the prevention of the peeling of the adhesive portions, the reason for this is that the peeling of the adhesive portions can be effectively prevented if the first and second base plate 116 and 118 have a linear expansion coefficient substantially equal to the linear expansion coefficient of the total reflection prism 112. In the case of the total reflection prism made of glass, the first and second base plate 116 and 118 can be made of, for example, ceramics or titanium. Further, the device body 107 can be made of, for example, an aluminum alloy.

<Action>

When the base 114 and the first and second base plates 116 and 118 are thermally deformed, the prism unit 110 acts as follows. That is, when the base 114 expands due to a temperature rise, the second base plate-fixing portion 114D is displaced in a direction in which the second base plate-fixing portion 114D becomes distant from the first base plate-fixing portion 114C. As a result, the second adhesive portion 118A is displaced in a direction in which the second adhesive portion 118A becomes distant from the first adhesive portion 116A. On the other hand, when the second base plate 118 expands due to a temperature rise, the second adhesive portion 118A is displaced in a direction in which the second adhesive portion 118A becomes distant from the second base plate-fixing portion 114D. This direction is a direction opposite to a direction in which the second adhesive portion 118A is displaced due to the expansion of the base 114, and is a direction approaching the first adhesive portion 116A. That is, since the second base plate 118 is displaced so as to offset the displacement of the base 114 when temperature is changed, an interval between the first and second adhesive portions 116A and 118A can be always maintained constant. Accordingly, since a force acting between the first and second prism blocks 120 and 122 of the total reflection prism 112 can be offset, the peeling of the bonding portion from the first and second prism blocks 120 and 122 can be prevented.

Further, since both the first and second prism blocks 120 and 122 are supported in the prism unit 110 of this embodiment, the total reflection prism 112 can be supported in a stable state.

Furthermore, since the first and second adhesive portions 116A and 118A are disposed close to each other in the prism unit 110 of this embodiment, an influence of thermal expansion can be minimized.

Even in the prism unit 110 of this embodiment, the second base plate 118 can include a first component and a second component as described in the second embodiment. Accordingly, the prism unit can be made to have a structure that is stronger against a change in temperature.

Other Embodiments

A case in which the prism unit according to the invention is built in a 3-plate type camera and a case in which the prism unit according to the invention is built in a projection display device have been described in the above-mentioned embodiments by way of example, but the application of the invention is not limited thereto. Further, the prism to which the invention is applied is also not limited to the color separation prism and the total reflection prism. A composite prism, which includes a plurality of prisms bonded to each other, can be applied likewise. For example, the invention can also be applied to a color synthesis prism having the same structure as the color separation prism. Particularly, the invention effectively acts on a composite prism in which prisms are bonded to each other with an air layer interposed therebetween.

In the above-mentioned embodiments, the frame-shaped spacer has been used when the prisms are bonded to each other with an air layer interposed therebetween. However, the shape of the spacer is not limited thereto.

FIGS. 11A and 11B are views showing other embodiments of the spacer, respectively (corresponding to a cross-sectional view of the bonding portion between the first and second prism blocks).

A form shown in FIG. 11A is a form in which the spacer 26 includes four rectangular plate pieces 26A and the respective plate pieces 26A are disposed at four corners of the bonding surface.

A form shown in FIG. 11B is a form in which the spacer 26 includes four long plate pieces 26B and each of the plate pieces 26B is disposed in the middle of each of four sides of the bonding surface.

In all of the forms, the spacer 26 is disposed in a region other than a region including the optical axis OP. Accordingly, the first and second prism blocks are bonded to each other so that an air layer is formed in the region including the optical axis OP.

Further, a composite prism in which the first and second prism blocks are bonded to each other with the air layer interposed therebetween has been described in the above-mentioned embodiments by way of example, but the invention can also be applied to a composite prism in which first and second prism blocks are gaplessly bonded to each other.

Example

Verification of Effect of the Invention

The following verification experiments have been performed to verify the effects of the invention.

In the prism unit having the structure shown in FIG. 1, the condition of "$\alpha L \Delta T - \beta M \Delta T - \gamma (L-M) \Delta T$" was changed by the change of the distance L between the first base plate-fixing portion 14C and the second base plate-fixing portion 14D and the distance M between the second base-fixing portion 18B and the second adhesive portion 18A, and a predetermined environmental test was performed for each condition.

In the environmental test, an operation for heating a prism unit up to 70° C. from the room temperature (25° C.) for 30 minutes and cooling the prism unit to the room temperature (25° C.) for 30 minutes after leaving the prism unit under the condition of 70° C. for 2 hours was performed in a constant-temperature tank as one cycle.

The material of the base 14 of the prism unit was set to stainless steel, the material of the second base plate 18 was set to an aluminum alloy, and the material of the prism of the color separation prism 12 was set to BK7 as optical glass.

The linear expansion coefficient $\alpha$ of the base 14 made of stainless steel was $1.7 \times 10^{-5}$ (exponent notation: 1.7E-5), the linear expansion coefficient (equivalent linear expansion coefficient) $\beta$ of the second base plate 18 made of an aluminum alloy was $2.4 \times 10^{-5}$ (exponent notation: 2.4E-5), and the linear expansion coefficient (equivalent linear expansion coefficient) $\gamma$ of the color separation prism 12 made of optical glass (BK7) was $7.1 \times 10^{-6}$ (exponent notation: 7.1E-6). Accordingly, the condition of "$\alpha < \beta$" was satisfied.

Further, an epoxy resin adhesive was used as the adhesive.

The following conditions A to K were set in regard to the condition of "$\alpha L \Delta T - \beta M \Delta T - \gamma (L-M) \Delta T$".

Condition A: L=10.8 mm, M=7.0 mm, (L−M)=3.8 mm $\alpha L \Delta T - \beta M \Delta T - \gamma (L-M) \Delta T = -5.2 \times 10^{-4}$ Condition B: L=11.0 mm, M=7.0 mm, (L−M)=4.0 mm $\alpha L \Delta T - \beta M \Delta T - \gamma (L-M) \Delta T = -4.5 \times 10^{-4}$ Condition C: L=11.1 mm, M=7.0 mm, (L−M)=4.1 mm $\alpha L \Delta T - \beta M \Delta T - \gamma (L-M) \Delta T = -4.0 \times 10^{-4}$ Condition D: L=11.7 mm, M=7.0 mm, (L−M)=4.7 mm $\alpha L \Delta T - \beta M \Delta T - \gamma (L-M) \Delta T = -9.3 \times 10^{-5}$ Condition E: L=11.9 mm, M=7.0 mm, (L−M)=4.9 mm $\alpha L \Delta T - \beta M \Delta T - \gamma (L-M) \Delta T = -4.5 \times 10^{-5}$ Condition F: L=12.0 mm, M=7.0 mm, (L−M)=5.0 mm $\alpha L \Delta T - \beta M \Delta T - \gamma (L-M) \Delta T = -2.2 \times 10^{-5}$ Condition G: L=12.1 mm, M=7.0 mm, (L−M)=5.1 mm $\alpha L \Delta T - \beta M \Delta T - \gamma (L-M) \Delta T = -4.4 \times 10^{-5}$ Condition H: L=12.2 mm, M=7.0 mm, (L−M)=5.2 mm $\alpha L \Delta T - \beta M \Delta T - \gamma (L-M) \Delta T = -9.6 \times 10^{-5}$ Condition I: L=12.9 mm, M=7.0 mm, (L−M)=5.9 mm $\alpha L \Delta T - \beta M \Delta T - \gamma (L-M) \Delta T = -4.0 \times 10^{-4}$ Condition J: L=13.0 mm, M=7.0 mm, (L−M)=6.0 mm $\alpha L \Delta T - \beta M \Delta T - \gamma (L-M) \Delta T = -4.6 \times 10^{-4}$ Condition K: L=13.2 mm, M=7.0 mm, (L−M)=6.2 mm $\alpha L \Delta T - \beta M \Delta T - \gamma (L-M) \Delta T = -5.4 \times 10^{-4}$ FIG. 12 is a table showing results of verification experiments about effects.

As shown in FIG. 12, it is possible to confirm that the prism unit can be made to have a structure stronger against a change in temperature when the prism unit is set so that the value of "$\alpha L \Delta T - \beta M \Delta T - \gamma (L-M) \Delta T$" as a change in interval is within the range of $\pm 4 \times 10^{-4}$.

EXAMPLES

Example 1

In a case in which the material of the base 14 is set to stainless steel, the material of the second base plate 18 is set to an aluminum alloy, and the material of the prism of the color separation prism 12 is set to BK7 as optical glass in the prism unit having the structure shown in FIG. 1, it is possible to prevent the peeling of the bonding portion between the first and second prism blocks 20 and 22 by setting the first base plate-fixing portion 14C, the second base plate-fixing portion 14D, the second base-fixing portion 18B, and the second adhesive portion 18A so that the following conditions are satisfied. That is, in a case in which a distance between the first and second base plate-fixing portions 14C and 14D is denoted by L and a distance between the second base-fixing portion 18B and the second adhesive portion 18A is denoted by M, the first base plate-fixing portion 14C, the second base plate-fixing portion 14D, the second base-fixing portion 18B, and the second adhesive portion 18A are set so that L is 12 mm and M is 7.03 mm.

Accordingly, since the conditions of "α<β and $-4\times10^{-4} \le \alpha L\Delta T - \beta M\Delta T - \gamma(L-M)\Delta T \le 4\times10^{-4}$" can be satisfied, the peeling of the bonding portion between the first and second prism blocks 20 and 22, which is caused by a change in temperature, can be prevented.

That is, in a case in which the material of the base 14 is set to stainless steel, the material of the second base plate 18 is set to an aluminum alloy, and the material of the prism of the color separation prism 12 is set to BK7 as optical glass, the linear expansion coefficient α of the base 14 (stainless steel) is $1.7\times10^{-5}$, the linear expansion coefficient (equivalent linear expansion coefficient) β of the second base plate 18 (aluminum alloy) is $2.4\times10^{-5}$, and the linear expansion coefficient (equivalent linear expansion coefficient) γ of the color separation prism 12 (optical glass (BK7)) is $7.1\times10^{-6}$. Accordingly, the condition of "α<β" is satisfied.

When the distance L between the first and second base plate-fixing portions 14C and 14D is set to 12 mm, the distance M between the second base-fixing portion 18B and the second adhesive portion 18A is set to 7.03 mm, and a change ΔT in temperature is set to 45° C. (70° C. from 25° C.), $\alpha L\Delta T - \beta M\Delta T - \gamma(L-M)\Delta T$ is $-3.1\times10^{-7}$ and the condition of "$-4\times10^{-4} \le \alpha L\Delta T - \beta M\Delta T - \gamma(L-M)\Delta T \le 4\times10^{-4}$" is also satisfied (more preferable condition ($\pm 5\times10^{-5}$) is also satisfied).

Accordingly, in a case in which the material of the base 14 is set to stainless steel, the material of the second base plate 18 is set to an aluminum alloy, and the material of the prism of the color separation prism 12 is set to BK7 as optical glass in the prism unit having the structure shown in FIG. 1, it is possible to prevent the peeling of the bonding portion between the first and second prism blocks 20 and 22, which is caused by a change in temperature, by setting the first base plate-fixing portion 14C, the second base plate-fixing portion 14D, the second base-fixing portion 18B, and the second adhesive portion 18A so that L is 12 mm and M is 7.03 mm.

Example 1 corresponds to Condition F of the verification experiments. It is possible to confirm that the prism unit of Example 1 has a structure strong against a change in temperature from the results of the verification experiments.

Example 2

In a case in which the material of the base 14 is set to titanium, the material of the second base plate 18 is set to stainless steel, and the material of the prism of the color separation prism 12 is set to BK7 as optical glass in the prism unit having the structure shown in FIG. 1, it is possible to prevent the peeling of the bonding portion between the first and second prism blocks 20 and 22 by setting the first base plate-fixing portion 14C, the second base plate-fixing portion 14D, the second base-fixing portion 18B, and the second adhesive portion 18A so that the following conditions are satisfied. That is, in a case in which a distance between the first and second base plate-fixing portions 14C and 14D is denoted by L and a distance between the second base-fixing portion 18B and the second adhesive portion 18A is denoted by M, the first base plate-fixing portion 14C, the second base plate-fixing portion 14D, the second base-fixing portion 18B, and the second adhesive portion 18A are set so that L is 12 mm and M is 1.58 mm.

Accordingly, since the conditions of "α<β and $-4\times10^{-4} \le \alpha L\Delta T - \beta M\Delta T - \gamma(L-M)\Delta T \le 4\times10^{-4}$" can be satisfied, the peeling of the bonding portion between the first and second prism blocks 20 and 22, which is caused by a change in temperature, can be prevented.

That is, in a case in which the material of the base 14 is set to titanium, the material of the second base plate 18 is set to stainless steel, and the material of the prism of the color separation prism 12 is set to BK7 as optical glass, the linear expansion coefficient α of the base 14 (titanium) is $8.4\times10^{-6}$, the linear expansion coefficient (equivalent linear expansion coefficient) of the second base plate 18 (stainless steel) is $1.7\times10^{-5}$, and the linear expansion coefficient (equivalent linear expansion coefficient) γ of the color separation prism 12 (optical glass (BK7)) is $7.1\times10^{-6}$. Accordingly, the condition of "α<β" is satisfied.

When the distance L between the first and second base plate-fixing portions 14C and 14D is set to 12 mm, the distance M between the second base-fixing portion 18B and the second adhesive portion 18A is set to 1.58 mm, and a change ΔT in temperature is set to 45° C. (70° C. from 25° C.), $\alpha L\Delta T - \beta M\Delta T - \gamma(L-M)\Delta T$ is $-1.9\times10^{-6}$ and the condition of "$-4\times10^{-4} \le \alpha L\Delta T - \beta M\Delta T - \gamma(L-M)\Delta T \le 4\times10^{-4}$" is also satisfied (more preferable condition ($\pm 5\times10^{-5}$) is also satisfied).

Accordingly, in a case in which the material of the base 14 is set to titanium, the material of the second base plate 18 is set to stainless steel, and the material of the prism of the color separation prism 12 is set to BK7 as optical glass in the prism unit having the structure shown in FIG. 1, it is possible to prevent the peeling of the bonding portion between the first and second prism blocks 20 and 22, which is caused by a change in temperature, by setting the first base plate-fixing portion 14C, the second base plate-fixing portion 14D, the second base-fixing portion 18B, and the second adhesive portion 18A so that L is 12 mm and M is 1.58 mm.

COMPARATIVE EXAMPLES

Comparative Example 1

A change in the interval of the bonding portion between the first and second prism blocks 20 and 22, which is obtained in a case in which the color separation prism 12 (composite prism) having the structure shown in FIG. 1 is bonded to a base plate made of stainless steel at two positions, is as follows.

$(E-\gamma)D\Delta T=0.005346$

Here, E denotes the linear expansion coefficient of the base plate made of stainless steel, and E is $1.7\times10^{-5}$. Further, γ denotes the linear expansion coefficient of the color separation prism 12, and γ is $7.1\times10^{-6}$. Furthermore, D denotes a distance between the adhesive portions, and D is 12 mm. Moreover, ΔT denotes a change in temperature up to 70° C. from 25° C., and ΔT is 45° C.

In this case, a change in the interval of the bonding portion between the first and second prism blocks 20 and 22 may exceed $\pm 4\times10^{-4}$, which is the allowable range thereof, and the bonding portion may be peeled.

Comparative Example 2

A change in the interval of the bonding portion between the first and second prism blocks 20 and 22, which is obtained in a case in which the color separation prism 12 (composite prism) having the structure shown in FIG. 1 is bonded to a base plate made of an aluminum alloy at two positions, is as follows.

$(Z-\gamma)D\Delta T=0.009126$

Here, Z denotes the linear expansion coefficient of the base plate made of an aluminum alloy, and Z is $2.4\times10^{-5}$.

Further, γ denotes the linear expansion coefficient of the color separation prism 12, and γ is $7.1 \times 10^{-6}$. Furthermore, D denotes a distance between the adhesive portions, and D is 12 mm. Moreover, ΔT denotes a change in temperature up to 70° C. from 25° C., and ΔT is 45° C.

Even in this case, a change in the interval of the bonding portion between the first and second prism blocks 20 and 22 may exceed $\pm 4 \times 10^{-4}$, which is the allowable range thereof, and the bonding portion may be peeled.

Comparative Example 3

A change in the interval of the bonding portion between the first and second prism blocks 20 and 22, which is obtained in a case in which the color separation prism 12 (composite prism) having the structure shown in FIG. 1 is bonded to a base plate made of titanium at two positions, is as follows.

$$(H-\gamma)D\Delta T = 0.000702$$

Here, H denotes the linear expansion coefficient of the base plate made of titanium, and H is $8.4 \times 10^{-6}$. Further, γ denotes the linear expansion coefficient of the color separation prism 12, and γ is $7.1 \times 10^{-6}$. Furthermore, D denotes a distance between the adhesive portions, and D is 12 mm. Moreover, ΔT denotes a change in temperature up to 70° C. from 25° C., and ΔT is 45° C.

Even in this case, a change in the interval of the bonding portion between the first and second prism blocks 20 and 22 may exceed $\pm 4 \times 10^{-4}$, which is the allowable range thereof, and the bonding portion may be peeled.

When a composite prism is bonded to one base plate as described above, the bonding portion of the prism may be peeled due to a change in temperature. However, it is possible to effectively prevent the peeling of the bonding portion of the prism by employing the invention.

EXPLANATION OF REFERENCES

1: 3-plate type camera
2: camera body
2A: bolt hole
3R, 3G, 3B: imaging element
3r, 3g, 3b: light-receiving surface
4: lens mount
10: prism unit
10A: prism unit
12: color separation prism
14: base
14A: leg portion
14a: bolt insertion hole
14B: prism support portion
14C: first base plate-fixing portion
14D: second base plate-fixing portion
16: first base plate
16A: first adhesive portion
16B: first base-fixing portion
16a: first prism-adhesive surface
16b: first base-fixing surface
18: second base plate
18A: second adhesive portion
18B: second base-fixing portion
18C: first component
18D: second component
18a: second prism-adhesive surface
18b: second base-fixing surface
20: first prism block
20S: base plate-installation surface
20a: imaging light-incident surface
20b: blue light-reflecting surface
20c: blue light-emitting surface
22: second prism block
22A: prism
22B: prism
22S: base plate-installation surface
22a: incident surface
22b: red light-reflecting surface
22c: red light-emitting surface
22d: green light-emitting surface
24: air layer
26: spacer
26A: plate piece
26B: plate piece
28: base fixing bolt
30: first bolt
32: second bolt
100: projection display device
101: light source
102: relay lens
103: total reflection mirror
104: field lens
105: reflective light valve
106: projection lens
107: device body
107A: bolt hole
110: prism unit
112: total reflection prism
114: base
114A: leg portion
114B: prism support portion
114C: first base plate-fixing portion
114D: second base plate-fixing portion
114a: bolt insertion hole
116: first base plate
116A: first adhesive portion
116B: first base-fixing portion
116a: first prism-adhesive surface
116b: first base-fixing surface
118: second base plate
118A: second adhesive portion
118B: second base-fixing portion
118a: second prism-adhesive surface
118b: second base-fixing surface
120: first prism block
120S: base plate-installation surface
122: second prism block
122S: base plate-installation surface
124: air layer
126: spacer
128: base fixing bolt
130: first bolt
132: second bolt
OL: optical axis of imaging lens
OP: optical axis

What is claimed is:
1. A prism unit comprising:
   a composite prism that includes a first prism block and a second prism block bonded to each other, the first prism block including at least one prism and the second prism block including at least one prism;
   a first base plate that comprises a first adhesive portion and a first base-fixing portion, the first prism block being bonded to the first adhesive portion;

a second base plate that comprises a second adhesive portion and a second base-fixing portion, the second prism block being bonded to the second adhesive portion; and a base that comprises a first base plate-fixing portion and a second base plate-fixing portion, the first base-fixing portion of the first base plate being fixed to the first base plate-fixing portion and the second base-fixing portion of the second base plate being fixed to the second base plate-fixing portion, wherein the second adhesive portion is disposed between the first base plate-fixing portion and the second base plate-fixing portion, and a direction in which the second base plate-fixing portion is displaced from the first base plate-fixing portion and a direction in which the second adhesive portion is displaced from the second base-fixing portion are opposite to each other in a case in which the base and the second base plate expand or contract due to a change in temperature, in a case in which a line passing through a center of a panel surface of an image forming panel adjacent to the composite prism and perpendicular to the panel surface is set as an optical axis, the first and second prism blocks of the composite prism are bonded to each other so as to form an air layer in a region including the optical axis, and the first and second prism blocks of the composite prism are bonded to each other with a spacer interposed therebetween in a region other than the region including the optical axis.

2. The prism unit according to claim 1,
wherein in a case in which a linear expansion coefficient of the base is denoted by $\alpha$, an equivalent linear expansion coefficient of the second base plate is denoted by $\beta$, an equivalent linear expansion coefficient of the composite prism is denoted by $\gamma$, a distance between the first and second base plate-fixing portions is denoted by L mm, a distance between the second base-fixing portion and the second adhesive portion is denoted by M mm, and a change in the temperature of the prism unit up to 70° C. from 25° C. is denoted by $\Delta T$° C., a relationship of "$\alpha<\beta$ and $-4\times10^{-4}\leq\alpha L\Delta T-\beta M\Delta T-\gamma(L-M)\Delta T\leq4\times10^{-4}$" is satisfied.

3. The prism unit according to claim 2,
wherein the first base plate has a linear expansion coefficient equal to the linear expansion coefficient of the first prism block.

4. The prism unit according to claim 3,
wherein the second base plate includes a first component and a second component bonded to each other, the first component comprises the second adhesive portion and has a linear expansion coefficient equal to a linear expansion coefficient of the first base plate, and the second component comprises the second base-fixing portion and has a linear expansion coefficient higher than the linear expansion coefficient of the base.

5. The prism unit according to claim 4,
wherein a difference between a position of the center of the first adhesive portion and a position of the center of the first base-fixing portion is within ±5 mm.

6. The prism unit according to claim 3,
wherein a difference between a position of the center of the first adhesive portion and a position of the center of the first base-fixing portion is within ±5 mm.

7. The prism unit according to claim 3,
wherein the first base-fixing portion is formed of a bolt hole and the first base plate is fixed to the first base plate-fixing portion of the base by a first bolt, and
the second base-fixing portion is formed of a bolt hole and the second base plate is fixed to the second base plate-fixing portion of the base by a second bolt.

8. The prism unit according to claim 2,
wherein the second base plate includes a first component and a second component bonded to each other, the first component comprises the second adhesive portion and has a linear expansion coefficient equal to a linear expansion coefficient of the first base plate, and the second component comprises the second base-fixing portion and has a linear expansion coefficient higher than the linear expansion coefficient of the base.

9. The prism unit according to claim 8,
wherein a difference between a position of the center of the first adhesive portion and a position of the center of the first base-fixing portion is within ±5 mm.

10. The prism unit according to claim 2,
wherein a difference between a position of the center of the first adhesive portion and a position of the center of the first base-fixing portion is within ±5 mm.

11. The prism unit according to claim 2,
wherein the first base-fixing portion is formed of a bolt hole and the first base plate is fixed to the first base plate-fixing portion of the base by a first bolt, and
the second base-fixing portion is formed of a bolt hole and the second base plate is fixed to the second base plate-fixing portion of the base by a second bolt.

12. The prism unit according to claim 1,
wherein the first base plate has a linear expansion coefficient equal to the linear expansion coefficient of the first prism block.

13. The prism unit according to claim 12,
wherein the second base plate includes a first component and a second component bonded to each other, the first component comprises the second adhesive portion and has a linear expansion coefficient equal to a linear expansion coefficient of the first base plate, and the second component comprises the second base-fixing portion and has a linear expansion coefficient higher than the linear expansion coefficient of the base.

14. The prism unit according to claim 12,
wherein a difference between a position of the center of the first adhesive portion and a position of the center of the first base-fixing portion is within ±5 mm.

15. The prism unit according to claim 12,
wherein the first base-fixing portion is formed of a bolt hole and the first base plate is fixed to the first base plate-fixing portion of the base by a first bolt, and
the second base-fixing portion is formed of a bolt hole and the second base plate is fixed to the second base plate-fixing portion of the base by a second bolt.

16. The prism unit according to claim 1,
wherein the second base plate includes a first component and a second component bonded to each other, the first component comprises the second adhesive portion and has a linear expansion coefficient equal to a linear expansion coefficient of the first base plate, and the second component comprises the second base-fixing portion and has a linear expansion coefficient higher than the linear expansion coefficient of the base.

17. The prism unit according to claim 16,
wherein a difference between a position of the center of the first adhesive portion and a position of the center of the first base-fixing portion is within ±5 mm.

18. The prism unit according to claim 1,
wherein a difference between a position of the center of the first adhesive portion and a position of the center of the first base-fixing portion is within ±5 mm.

19. The prism unit according to claim 1,
wherein the first base-fixing portion is formed of a bolt hole and the first base plate is fixed to the first base plate-fixing portion of the base by a first bolt, and
the second base-fixing portion is formed of a bolt hole and the second base plate is fixed to the second base plate-fixing portion of the base by a second bolt.

20. The prism unit according to claim 1,
wherein the composite prism is a color separation prism or a color synthesis prism that includes the first and second prism blocks bonded to each other so as to form the air layer in the region including the optical axis, and the first prism block is formed of one prism and the second prism block is formed of two prisms bonded to each other.

* * * * *